(12) United States Patent
Watanabe et al.

(10) Patent No.: US 6,537,667 B2
(45) Date of Patent: Mar. 25, 2003

(54) ELECTRO-CONDUCTIVE OXIDE PARTICLE AND PROCESS FOR ITS PRODUCTION

(75) Inventors: Yoshitane Watanabe, Sodegaura (JP); Tadayuki Isaji, Sodegaura (JP); Osamu Fujimoto, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/988,560

(22) Filed: Nov. 20, 2001

(65) Prior Publication Data

US 2002/0090513 A1 Jul. 11, 2002

(30) Foreign Application Priority Data

Nov. 21, 2000 (JP) .......................... 2000-354708
Jan. 9, 2001 (JP) .......................... 2001-001230

(51) Int. Cl.[7] ................................. B32B 5/16
(52) U.S. Cl. .................. 428/403; 428/404; 428/323; 428/325; 428/332; 428/688; 430/523; 423/593; 361/56; 252/514; 252/520; 252/521
(58) Field of Search ............... 428/403, 404, 428/688, 323, 325, 332; 430/523; 423/593; 252/514, 520, 521; 361/56

(56) References Cited

U.S. PATENT DOCUMENTS

| | | | | |
|---|---|---|---|---|
| 5,582,909 A | * | 12/1996 | Watanabe | 428/323 |
| 5,756,009 A | * | 5/1998 | Watanabe | 252/519.1 |
| 5,772,924 A | | 6/1998 | Hayashi et al. | 252/520.1 |
| 5,861,112 A | * | 1/1999 | Watanabe | 252/519.1 |

FOREIGN PATENT DOCUMENTS

| | | |
|---|---|---|
| EP | 0 654 447 A1 | 5/1995 |
| EP | 0 677 593 | 10/1995 |
| JP | 7-144917 | 6/1995 |
| JP | 8-131815 | 5/1996 |
| JP | 9-142922 | 6/1997 |

OTHER PUBLICATIONS

Patent Abstracts of Japan, JP 10–269843, Oct. 9, 1998.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

An electro-conductive oxide particle comprising indium atoms, antimony atoms and oxygen atoms in a molar ratio of Sb/In of from 0.03 to 0.08, having a primary particle diameter of from 2 to 300 nm, and having a crystal structure of indium oxide.

60 Claims, 6 Drawing Sheets

ELECTRO-CONDUCTIVE OXIDE PARTICLE AND PROCESS FOR ITS PRODUCTION

The present invention relates to an electro-conductive oxide particle comprising indium atoms, antimony atoms and oxygen atoms or comprising these atoms and zinc atoms, and an electro-conductive oxide particle comprising indium atoms, niobium atoms and oxygen atoms or comprising these atoms and antimony atoms. The electro-conductive oxide particle of the present invention has electro-conductivity and thus is useful as e.g. electro-conductive agents, antistatic agents, electromagnetic wave shielding agents or electric resistance for e.g. plastics, fibers, paper, glass or ceramics.

For liquid crystal displays (LCD) to be used for e.g. display devices of electronic equipment, a transparent electro-conductive thin film is an essential component. As an electro-conductive oxide particle which is a chief material for formation of such a thin film, tin-doped indium oxide (ITO) has conventionally been mentioned first.

JP-A-9-142922 discloses a process for producing an ITO sintered product, which comprises putting a powder mixture containing indium oxide and tin oxide as main components in a mold made of graphite, followed by hot pressing.

Along with various thin film formation techniques, development of more excellent ITO particles has been conducted. Further, methods of coating a coating having ITO particles dispersed therein have been studied in recent years, and ITO particles suitable for these coating methods are also studied actively.

JP-A-8-131815 discloses an indium oxide sol having crystalline indium oxide fine particles containing one or at least two different types of elements selected from the group consisting of Si, Ge, Sn, Zr and Ti, dispersed in water and/or an organic solvent.

Further, JP-A-7-144917 discloses an electro-conductive oxide particle comprising indium atoms, antimony atoms and oxygen atoms in a molar ratio of In:Sb:O of 1:0.02–1.25:1.55–4.63. It also discloses an electro-conductive oxide particle having a molar ratio of In:Sb:O of 1:0.83–1.25:3.58–4.63 and having a crystal structure of indium antimonate, and an electro-conductive oxide particle having a molar ratio of In:Sb:O of 1:0.02–0.10:1.55–1.75 and having a crystal structure of indium oxide.

It was found that the above-described indium antimonate when press-molded under a pressure of 300 kg/cm$^2$ exhibits a good electro-conductivity with a specific resistance of 10 Ωcm, however, it is possible to further improve the electro-conductivity.

It is an object of the present invention to provide an electro-conductive oxide particle having an excellent electro-conductivity and useful for coating methods also, by studying e.g. molar ratio of antimony and indium and production process.

Further, it was found that niobium can be used instead of antimony. It is an object of the present invention to provide an electro-conductive oxide particle having an excellent electro-conductivity and useful for coating methods also, by studying e.g. molar ratio of niobium, antimony and indium and production process.

According to a first aspect of the present invention, there is provided an electro-conductive oxide particle comprising indium atoms, antimony atoms and oxygen atoms in a molar ratio of Sb/In of from 0.03 to 0.08, having a primary particle diameter of from 2 to 300 nm, and having a crystal structure of indium oxide.

According to a second aspect of the present invention, there is provided an electro-conductive oxide particle comprising indium atoms, antimony atoms and oxygen atoms in a molar ratio of Sb/In of from 0.04 to 0.06, having a primary particle diameter of from 2 to 300 nm, and having a crystal structure of indium oxide.

According to a third aspect of the present invention, there is provided an electro-conductive oxide particle comprising indium atoms, antimony atoms, zinc atoms and oxygen atoms in a molar ratio of Sb/In of from 0.03 to 0.08 and in a molar ratio of Zn/Sb of from 0.02 to 2.50, having a primary particle diameter of from 2 to 300 nm, and having a crystal structure of indium oxide.

According to a fourth aspect of the present invention, there is provided an electro-conductive oxide particle comprising indium atoms, niobium atoms and oxygen atoms in a molar ratio of Nb/In of from 0.01 to 0.10, having a primary particle diameter of from 2 to 300 nm, and having a crystal structure of indium oxide.

According to a fifth aspect of the present invention, there is provided an electro-conductive oxide particle comprising indium atoms, niobium atoms and oxygen atoms in a molar ratio of Nb/In of from 0.03 to 0.08, having a primary particle diameter of from 2 to 300 nm, and having a crystal structure of indium oxide.

According to a sixth aspect of the present invention, there is provided an electro-conductive oxide particle comprising indium atoms, niobium atoms, antimony atoms and oxygen atoms in a molar ratio of (Nb+Sb)/In of from 0.01 to 0.10 and in a molar ratio of Sb/(Nb+Sb) of from 0.01 to 0.99, having a primary particle diameter of from 2 to 300 nm, and having a crystal structure of indium oxide.

According to a seventh aspect of the present invention, there is provided the electro-conductive oxide particle according to any one of the first to sixth aspects, which is a stick particle having an aspect ratio of from 2 to 10.

According to an eighth aspect of the present invention, there is provided a process for producing the electro-conductive oxide particle as defined in any one of the first to sixth aspects, which comprises calcining a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, in the air at a temperature of from 500 to 900° C.

According to a ninth aspect of the present invention, there is provided a process for producing the electro-conductive oxide particle as defined in any one of the first to sixth aspects, which comprises calcining a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, in the air at a temperature of from 500 to 900° C., followed by reducing calcination in an atmosphere comprising hydrogen and nitrogen in a volume% of 2 100:98–0 at a temperature of from 80 to 450° C.

According to a tenth aspect of the present invention, there is provided a process for producing the electro-conductive oxide particle as defined in any one of the first to sixth aspects, which comprises contacting a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with an alkali compound in an aqueous medium to form a slurry of indium hydroxide doped with at least one metal element, washing and drying the slurry and calcining it in the air at a temperature of from 500 to 900° C.

According to an eleventh aspect of the present invention, there is provided a process for producing the electro-conductive oxide particle as defined in any one of the first to sixth aspects, which comprises contacting a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with an alkali compound in an aqueous medium to form a slurry of indium hydroxide doped with at least one metal element, washing and drying the slurry and calcining it in the air at a temperature of from 500 to 900° C., followed by reducing calcination in an atmosphere comprising hydrogen and nitrogen in a volume % of 2–100:98–0 at a temperature of from 80 to 450° C.

According to a twelfth aspect of the present invention, there is provided a process for producing the electro-conductive oxide particle as defined in the seventh aspect, which comprises contacting a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with an alkali compound in an aqueous medium at a temperature of from 0 to 10° C. to form a slurry of indium hydroxide doped with at least one metal element, washing and drying the slurry and calcining it in the air at a temperature of from 500 to 900° C.

According to a thirteenth aspect of the present invention, there is provided a process for producing the electro-conductive oxide particle as defined in the seventh aspect, which comprises contacting a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with an alkali compound in an aqueous medium at a temperature of from 0 to 10° C. to form a slurry of indium hydroxide doped with at least one metal element, washing and drying the slurry and calcining it in the air at a temperature of from 500 to 900° C., followed by reducing calcination in an atmosphere comprising hydrogen and nitrogen in a volume % of 2–100:98–0 at a temperature of from 80 to 450° C.

According to a fourteenth aspect of the present invention, there is provided a process for producing the electro-conductive oxide particle as defined in the seventh aspect, which comprises contacting an aqueous medium containing a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with a heat resistant strongly basic ion exchange resin, followed by heating at a temperature of from 40 to 100° C. to form a slurry of indium hydroxide doped with at least one metal element, drying the slurry and calcining it in the air at a temperature of from 500 to 900° C.

According to a fifteenth aspect of the present invention, there is provided a process for producing the electro-conductive oxide particle as defined in the seventh aspect, which comprises contacting an aqueous medium containing a composition selected from the group consisting of a mixture of an In compound and an Sb compound, a mixture of an In compound, an Sb compound and a Zn compound, a mixture of an In compound and a Nb compound, and a mixture of an In compound, a Nb compound and an Sb compound, with a heat resistant strongly basic ion exchange resin, followed by heating at a temperature of from 40 to 100° C. to form a slurry of indium hydroxide doped with at least one metal element, drying the slurry and calcining it in the air at a temperature of from 500 to 900° C., followed by reducing calcination in an atmosphere comprising hydrogen and nitrogen in a volume % of 2–100:98–0 at a temperature of from 80 to 450° C.

Now, the present invention will be described in detail with reference to the preferred embodiments.

Figure 1:
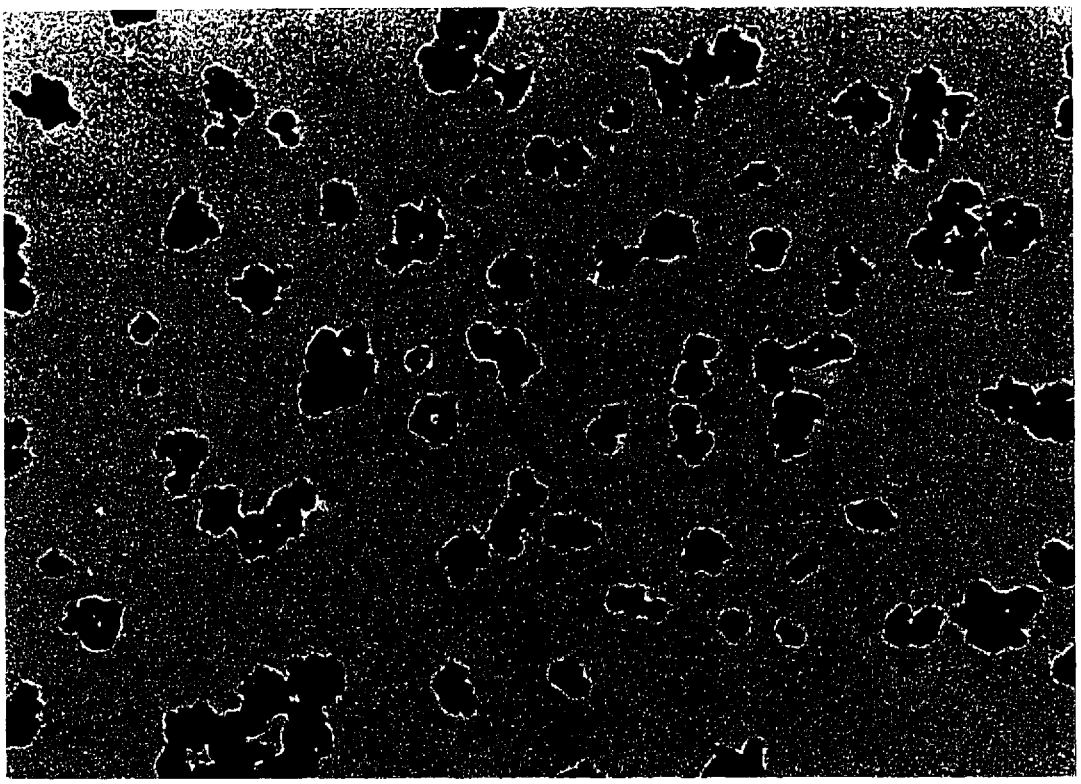
FIG. 1 is a transmission electron microscopic photograph showing the particle structure of an aqueous sol of electro-conductive oxide particles having a crystal structure of indium oxide prepared in Example 1, and the magnification is 200,000 times.
Figure 2:
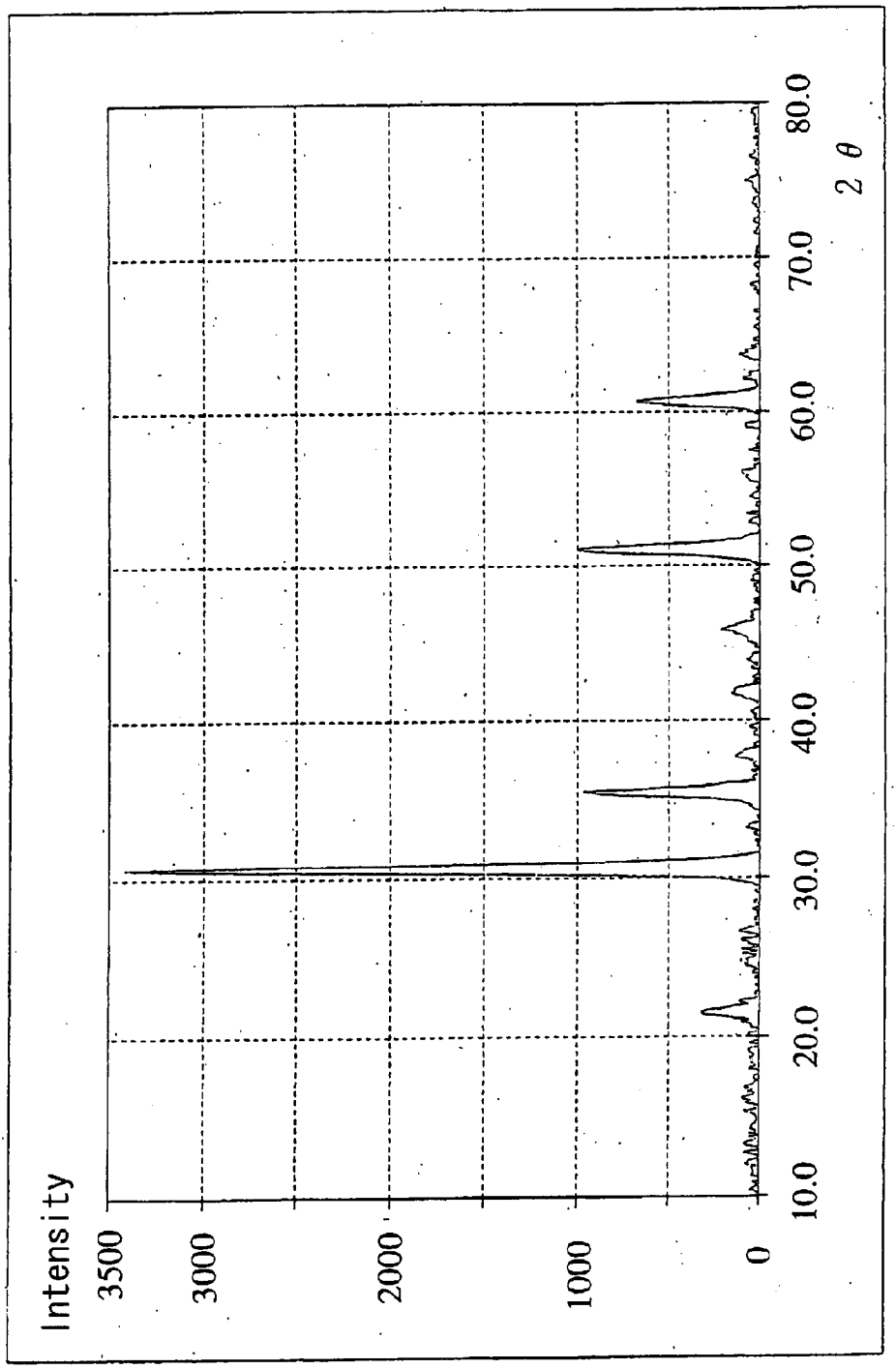
FIG. 2 is an X-ray diffraction pattern of the electro-conductive oxide particles having a crystal structure of indium oxide prepared in Example 1.
Figure 3:
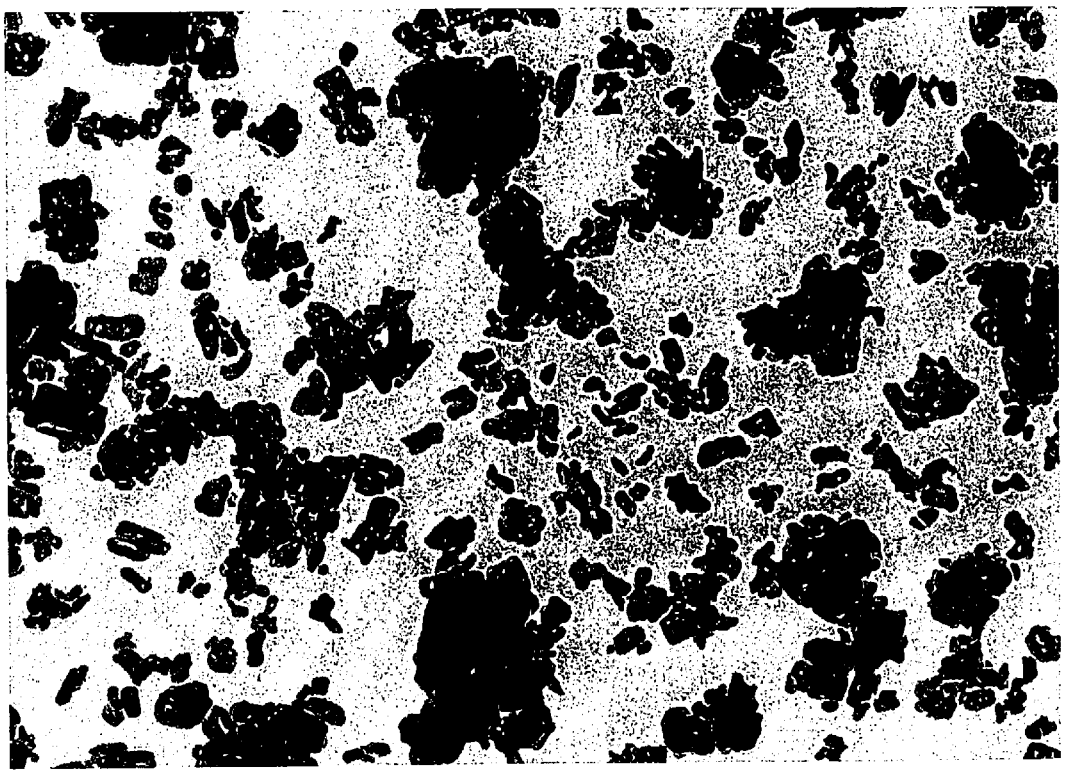
FIG. 3 is a transmission electron microscopic photograph showing the particle structure of an aqueous sol of electro-conductive oxide particles having a crystal structure of indium oxide prepared in Example 8, and the magnification is 200,000 times.
Figure 4:
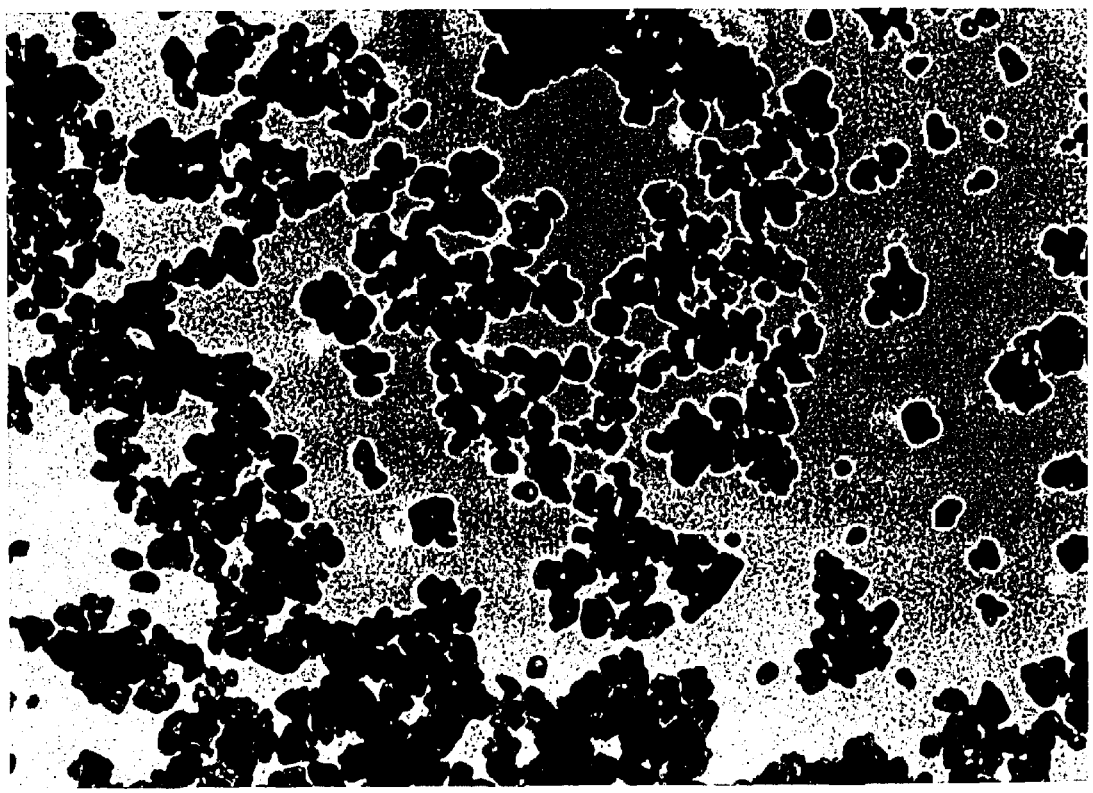
FIG. 4 is a transmission electron microscopic photograph showing the particle structure of an aqueous sol of electro-conductive oxide particles having a crystal structure of indium oxide prepared in Example 12, and the magnification is 200,000 times.
Figure 5:
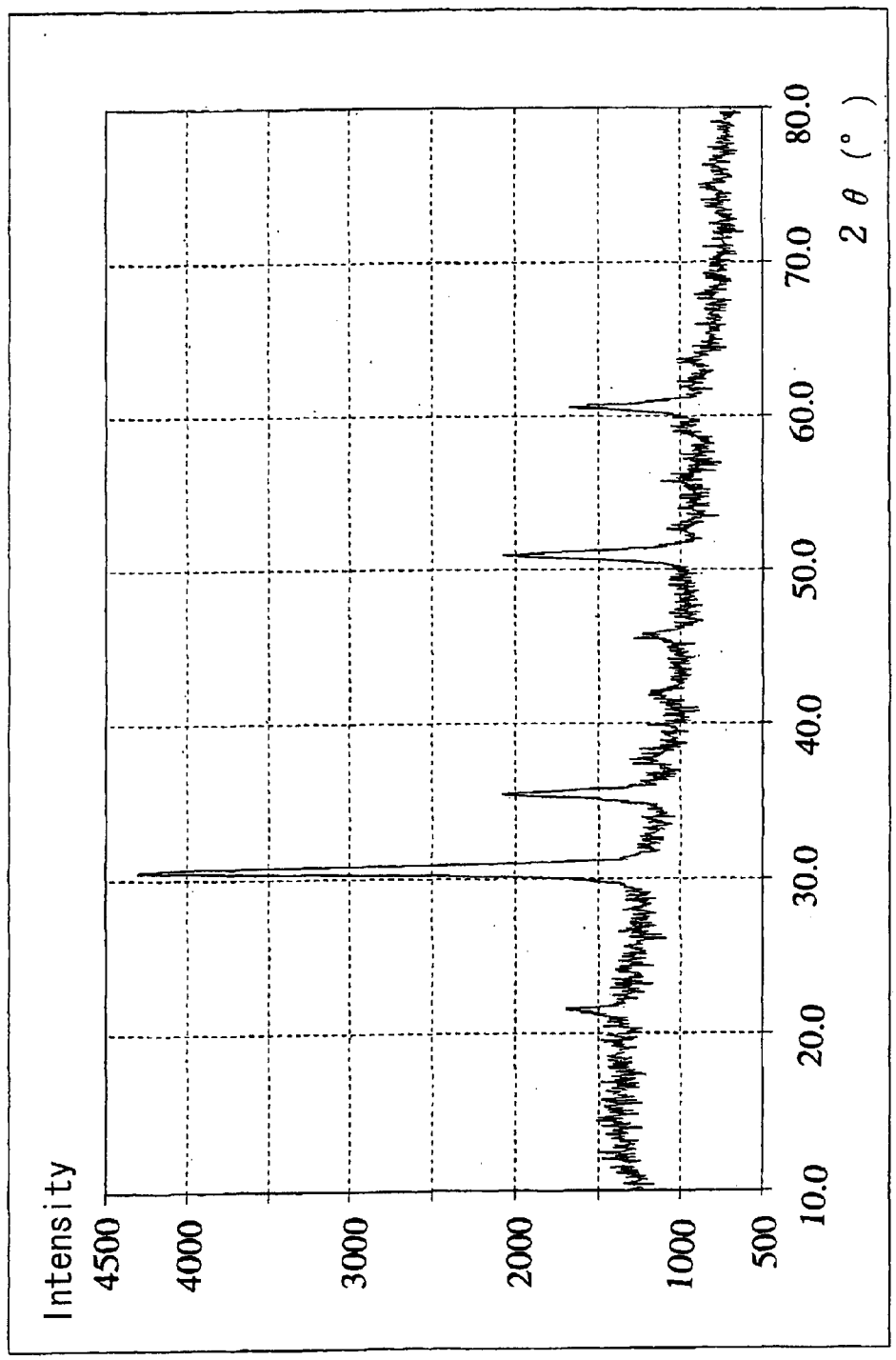
FIG. 5 is an X-ray diffraction pattern of the electro-conductive oxide particles having a crystal structure of indium oxide prepared in Example 12.
Figure 6:
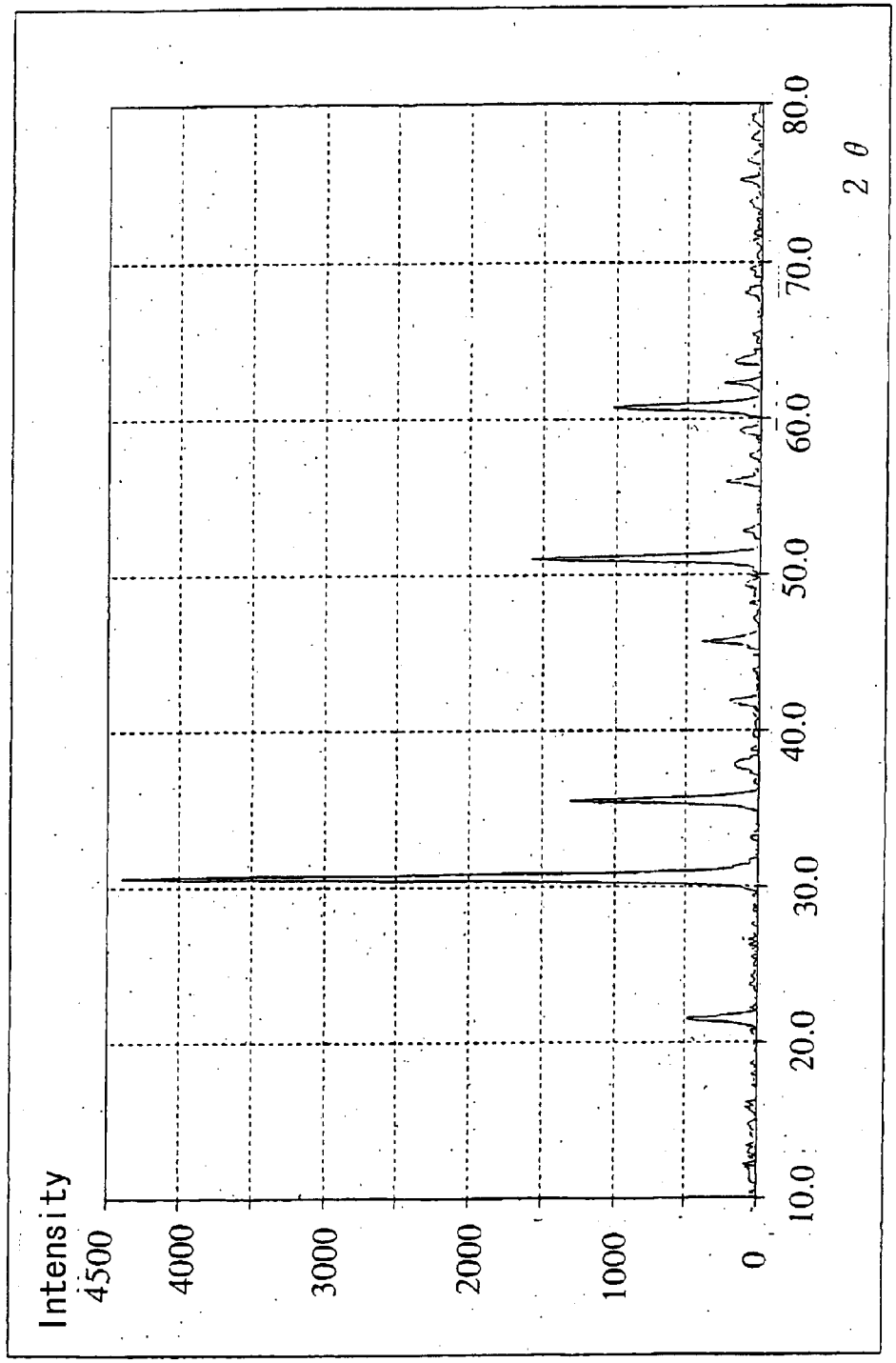
FIG. 6 is an X-ray diffraction pattern of indium oxide prepared in Comparative Example 1.

The present invention provides an electro-conductive oxide particle (1) comprising indium atoms, antimony atoms and oxygen atoms in a molar ratio of Sb/In of from 0.03 to 0.08, having a primary particle diameter of from 2 to 300 nm, and having a crystal structure of indium oxide.

Here, the primary particle diameter is not a diameter of agglomerated electro-conductive oxide particles but is a diameter of one electro-conductive oxide particle when the agglomerated particles are separated into individual particle.

According to the present invention, an electro-conductive oxide particle (2) comprising indium atoms, antimony atoms and oxygen atoms in a molar ratio of Sb/In of from 0.04 to 0.06, having a primary particle diameter of from 2 to 300 nm, and having a crystal structure of indium oxide, is preferably obtained.

Further, an electro-conductive oxide particle containing zinc in addition to indium and antimony as constituting metal elements can be obtained. Namely, the present invention provides an electro-conductive oxide particle (3) comprising indium atoms, antimony atoms, zinc atoms and oxygen atoms in a molar ratio of Sb/In of from 0.03 to 0.08 and in a molar ratio of Zn/Sb of from 0.02 to 2.50, having a primary particle diameter of from 2 to 300 nm, and having a crystal structure of indium oxide.

The electro-conductive oxide particle (1) comprising indium atoms, antimony atoms and oxygen atoms may be obtained by a production process of mixing an indium compound and an antimony compound in a molar ratio of Sb/In of from 0.03 to 0.08, and calcining the mixture in the air at a temperature of from 500 to 900° C. Preferably, the electro-conductive oxide particle (2) comprising indium atoms, antimony atoms and oxygen atoms may be obtained by a production process of mixing an indium compound and an antimony compound in a molar ratio of Sb/In of from 0.04 to 0.06 and calcining the mixture in the air at a temperature of from 500 to 900° C.

Further, the electro-conductive oxide particle (3) comprising indium atoms, antimony atoms, zinc atoms and oxygen atoms may be obtained by a process of mixing an indium compound, an antimony compound and a zinc compound in a molar ratio of Sb/In of from 0.03 to 0.08 and in a molar ratio of Zn/Sb of from 0.02 to 2.50 and calcining the mixture in the air at a temperature of from 500 to 900° C.

In the present invention, as a process to produce a particle having a higher electro-conductivity, a reducing calcination may further be employed together with the above-described processes.

Namely, the electro-conductive oxide particle (1) comprising indium atoms, antimony atoms and oxygen atoms may be obtained by mixing an indium compound and an antimony compound in a molar ratio of Sb/In of from 0.03 to 0.08, calcining the mixture in the air at a temperature of from 500 to 900° C., followed by reducing calcination in an atmosphere comprising hydrogen and nitrogen in a volume % of 2–100:98–0 at a temperature of from 80 to 450° C. Preferably, the electro-conductive oxide particle (2) comprising indium atoms, antimony atoms and oxygen atoms may be obtained by a production process of mixing an indium compound and an antimony compound in a molar ratio of Sb/In of from 0.04 to 0.06 and calcining the mixture in the air at a temperature of 500 to 900° C., followed by reducing calcination in an atmosphere comprising hydrogen and nitrogen in a volume % of 2–100:98–0 at a temperature of from 80 to 450° C. Further, the electro-conductive oxide particle (3) comprising indium atoms, antimony atoms, zinc atoms and oxygen atoms may be obtained by a method which comprises mixing an indium compound, an antimony compound and a zinc compound in a molar ratio of Sb/In of from 0.03 to 0.08 and in a molar ratio of Zn/Sb of from 0.02 to 2.50, and calcining the mixture in the air at a temperature of from 500 to 900° C., followed by reducing calcination in an atmosphere comprising hydrogen and nitrogen in a volume % of 2–100:98–0 at a temperature of from 80 to 450° C.

As the indium compound to be used in the present invention, mono- to tri-valent indium compound may be used, and at least one indium compound selected from the group consisting of indium hydroxide, indium oxide, an indium salt of inorganic acid, an indium salt of organic acid and an organic indium compound may be used.

The indium salt of inorganic acid may, for example, be indium nitrate, indium chloride, indium sulfate or indium sulfamate. The indium salt of organic acid may, for example, be indium oxalate. The organic indium compound may, for example, be an alkoxide of indium, such as triethoxy indium. These indium compounds may be those commercially available as industrial chemicals. However, in a case of using an indium salt, preferred are salts having an acid which is readily volatile by calcining, such as a nitrate, a hydrochloride and an organic acid salt. Among them, particularly preferred is indium chloride, and this may be used alone or as a mixture. These indium compounds may be employed in the form of a liquid dispersed or dissolved in an aqueous solution or in an organic solvent, or in a powder form.

As the antimony compound to be used in the present invention, a tri- to penta-valent antimony compound may be used, and at least one antimony compound selected from the group consisting of antimony oxide, an antimony salt of inorganic acid, an antimonate, an antimony salt of organic acid and an organic antimony compound may be employed.

The antimony salt of inorganic acid may, for example, be antimony nitrate, basic antimony nitrate, antimony chloride, antimony oxychloride or antimony sulfate. The antimonate may, for example, be potassium antimonate. The antimony salt of organic acid may, for example, be potassium antimony oxalate. The organic antimony compound may, for example, be an alkoxide of antimony, such as triethoxy antimony. These antimony compounds may be those commercially available as industrial chemicals. However, in a case of using an antimony salt, preferred are salts having an acid which is readily volatile by calcinating, such as a nitrate, a hydrochloride and an organic acid salt. Among them, particularly preferred are antimony chloride and potassium antimonate, and they may be used alone or as a mixture. These antimony compounds may be employed in the form of a liquid dispersed or dissolved in an aqueous solution or in an organic solvent, or in a powder form.

As the zinc compound to be used in the present invention, at least one zinc compound selected from the group consisting of zinc hydroxide, zinc oxide, a zinc salt of inorganic acid, a zincate, a zinc salt of organic acid and an organic zinc compound may be employed.

The zinc salt of inorganic acid may, for example, be zinc nitrate, basic zinc nitrate, zinc chloride or zinc sulfate. The zincate may, for example, be potassium zincate. The zinc salt of organic acid may, for example, be zinc acetate. The organic zinc compound may, for example, be an alkoxide of zinc, such as methoxyethoxy zinc. These zinc compounds may be those commercially available as industrial chemicals. However, in a case of using a zinc salt, preferred are salts having an acid which is readily volatile by calcining, such as a nitrate, a hydrochloride and an organic acid salt. Among them, particularly preferred are zinc chloride and zinc oxide, and they may be used alone or as a mixture. These zinc compounds may be employed in a form of a liquid dispersed or dissolved in an aqueous solution or in an organic solvent, or in a powder form.

In a case where either of the indium compound and the antimony compound or any of these compounds and the zinc compound is a solution, mixing may be carried out by means of an apparatus such as a Satake-type stirrer, a Pfaudler-type stirrer or a disper at a mixing temperature of from 0 to 100° C. for a mixing time of from 0.1 to 30 hours.

In a case where both the indium compound and the antimony compound or all of these compounds and the zinc compound are in a powder form, mixing may be carried out by means of an apparatus such as a mortar, V-type mixer, a Henschel mixer or a ball mill.

It is particularly preferred to mix a water-soluble indium compound and a water-soluble antimony compound. In such a case, the mixing temperature may be from 0 to 100° C. However, the higher the mixing temperature, the larger the particle diameter of the electro-conductive oxide particle to be formed, and the more the transparency during dispersing tends to decrease, and accordingly the mixing temperature is preferably low, and the mixing is carried out preferably from 0 to 50° C.

Further, during mixing, pH of the mixture may be controlled with ammonia, a hydroxide of an alkali metal, an organic base such as guanidine hydroxide, an inorganic acid such as hydrochloric acid or nitric acid or an organic acid such as acetic acid, as the case requires. Among them, preferred is a hydroxide of an alkali metal, particularly preferred is an aqueous potassium hydroxide solution.

In the present invention, the mixture (slurry) of the indium compound and the antimony compound may be separated by suction filtration, centrifugal separation or filter press, and soluble impurities derived from the starting material may be removed by washing with water. In such a case, washing is carried out until the conductivity of the filtrate becomes at most 1,000 µS/cm, preferably at most 100 µS/cm. The slurry or cake obtained after the washing may be dried by e.g. a spray dryer, a drum dryer, a box-type hot-air dryer, a vacuum dryer or a freeze drying machine. Here, the drying temperature is not particularly limited, but is preferably not higher than 300° C. from the viewpoint of the apparatus or operation.

In the present invention, the dried product of the mixture of the indium compound and the antimony compound or the mixture of these compounds and the zinc compound, is calcined at a calcination temperature of from 500 to 900° C., preferably from 600 to 750° C., for from 0.5 to 50 hours, preferably from 1 to 20 hours. Here, the air may be employed as the calcination atmosphere, but the proportion of oxygen and nitrogen or another inert gas may be changed. By such calcining, indium oxide and antimony oxide, or indium oxide, antimony oxide and zinc oxide are reacted by solid phase reaction to form the electro-conductive oxide particle having a crystal structure of indium oxide.

Further, in a case where a higher electro-conductivity is required, this calcined powder is subjected to reducing calcination in an atmosphere comprising from 2 to 100 vol %, preferably from 2 to 50 vol %, of hydrogen and nitrogen as the rest, at a temperature of from 80 to 450° C., preferably from 100 to 300° C., for from 0.1 to 30 hours, preferably from 0.5 to 10 hours. By carrying out such a reducing calcination to form oxygen deficiency in the crystal structure, an electro-conductive oxide particle having an excellent electro-conductivity can be obtained.

The electro-conductive oxide particle of the present invention is yellowish green to bluish gray. X-ray diffraction peaks of the electro-conductive oxide particle having a crystal structure of indium oxide obtained by the above process of the present invention were found to be slightly shifted from the diffraction peaks of pure indium oxide.

Further, as a result of observation by a transmission electron microscope, the electro-conductive oxide particle of the present invention was confirmed to be a particle of a colloidal level with a primary particle diameter of from 2 to 300 nm, preferably from 5 to 50 nm.

Further, the electro-conductive oxide particle of the present invention was confirmed to have excellent electro-conductivity with a specific resistance at a level of from 0.1 to 50 Ωcm when press-molded under a pressure of 300 kg/cm$^2$. The electro-conductive oxide particle obtained by the present invention can readily be made into an aqueous sol or an organic solvent sol by wet-pulverization in water or in an organic solvent by e.g. a sand grinder, a ball mill, a homogenizer, a disper, a colloid mill, an ultrasonic homogenizer or a high pressure homogenizer. In the present invention, the obtained aqueous sol of the electro-conductive oxide particle may be contacted with an ion exchange resin, as the case requires, to remove impurity ions and to obtain an aqueous sol of the electro-conductive oxide particle having a high purity.

In the present invention, by using an indium compound and an antimony compound, the reactivity is remarkably high even at a temperature of not more than 1,000° C., and a uniform phase can be formed, and thus, an oxide having excellent electro-conductivity can be obtained. Further, in the present invention, no calcination is carried out at such a high temperature as exceeding 900° C., and accordingly, there will be no growth of particle due to sintering, and the product will be in the form of particles of from 2 to 300 nm. Such particles can readily be dispersed in water and/or an organic solvent to obtain a sol.

In the present invention, if the Sb/In molar ratio exceeds 0.1, impurities tend to be present in the product, thus decreasing the electro-conductivity, such being unfavorable. On the other hand, if the Sb/In molar ratio is less than 0.02, the strain in the crystal structure of indium oxide tends to be small, such being unfavorable, whereby the electro-conductivity tends to be low. In the present invention, the time for mixing the indium compound and the antimony compound, or such compounds and the zinc compound, is from 0.1 to 30 hours. It may be less than 0.1 hour, but such is not desirable since the mixing is likely to be inadequate. The mixing may be conducted more than 30 hours, but such is not efficient, since the production time will be unnecessarily long. In the present invention, the temperature for calcining the dried product of the mixture of the indium compound and the antimony compound, or the dried product of the mixture of the indium compound, the antimony compound and the zinc compound, is from 500 to 900° C. If the calcining temperature is less than 500° C., no adequate solid phase reaction tends to take place, and no electro-conductive oxide particle tends to be obtained. Further, if it is at most 900° C., although the solid phase reaction of indium oxide and antimony oxide proceeds, particle growth due to sintering tends to take place, such being unfavorable.

In the present invention, the temperature for reducing calcination which is carried out in an atmosphere comprising from 2 to 100 vol % of hydrogen and nitrogen as the rest to obtain a particle having a higher electro-conductivity, after calcination of the dried product of the mixture of the indium compound and the antimony compound or the dried product of the mixture of the indium compound, the antimony compound and the zinc compound at a temperature of from 500 to 900° C., is from 80 to 450° C. If it is less than 80° C., no adequate reducing reaction tends to take place, whereby no sufficient oxygen deficiency may be formed. Further, if it exceeds 450° C., the reduction tends to proceed more than necessary, whereby a mixture of metal indium and metal antimony is likely to form, such being unfavorable.

The present invention further provides an electro-conductive oxide particle (4) comprising indium atoms, niobium atoms and oxygen atoms in a molar ratio of Nb atom/In atom of from 0.01 to 0.10, having a primary particle diameter of from 2 to 300 nm, and having a crystal structure of indium oxide.

Here, the primary particle diameter is not a diameter of agglomerated electro-conductive oxide particles but is a diameter of one electro-conductive oxide particle when the agglomerated particles are separated into individual particle.

According to the present invention, an electro-conductive oxide particle (5) comprising indium atoms, niobium atoms and oxygen atoms in a molar ratio of Nb/In of from 0.03 to 0.08, having a primary particle diameter of from 2 to 300 nm, and having a crystal structure of indium oxide, is preferably obtained.

Further, an electro-conductive oxide particle containing antimony in addition to indium and niobium as constituting metal elements can be obtained. Namely, the present invention provides an electro-conductive oxide particle (6) comprising indium atoms, niobium atoms, antimony atoms and oxygen atoms in a molar ratio of (Nb+Sb)/In of from 0.01 to 0.10 and in a molar ratio of Sb/(Nb+Sb) of from 0.01 to 0.99, having a primary particle diameter of from 2 to 300 nm, and having a crystal structure of indium oxide.

A process for producing the electro-conductive oxide particle (4) comprising indium atoms, niobium atoms and oxygen atoms comprises at least a step of mixing an indium compound and a niobium compound in a molar ratio of Nb/In of from 0.01 to 0.10, followed by calcination at a temperature of from 500 to 900° C. Preferably, a process for producing the electro-conductive oxide particle (5) comprising indium atoms, niobium atoms and oxygen atoms comprises at least a step of mixing an indium compound and a niobium compound in a molar ratio of Nb/In of from 0.03 to 0.08, followed by calcination at a temperature of from 500 to 900° C.

A process for producing the electro-conductive oxide particle (6) comprising indium atoms, niobium atoms, antimony atoms and oxygen atoms comprises at least a step of mixing an indium compound, a niobium compound and an antimony compound in a molar ratio of (Nb+Sb)/In of from 0.01 to 0.10 and in a molar ratio of Sb/(Nb+Sb) of from 0.01 to 0.99, followed by calcination at a temperature of from 500 to 900° C.

As the process for producing the electro-conductive particle of the present invention, reducing calcination may further be employed together with the above step.

Namely, the electro-conductive oxide particle (4) comprising indium atoms, niobium atoms and oxygen atoms is obtained by mixing an indium compound and a niobium compound in a molar ratio of Nb/In of from 0.01 to 0.10, calcining the mixture at a temperature of from 500 to 900° C., followed by reducing calcination in an atmosphere comprising hydrogen and nitrogen in a volume % of 2–100:98–0 at a temperature of from 80 to 450° C. Preferably, the electro-conductive oxide particle (5) comprising indium atoms, niobium atoms and oxygen atoms is obtained by mixing an indium compound and a niobium compound in a molar ratio of Nb/In of from 0.03 to 0.08, and calcining the mixture at a temperature of from 500 to 900° C., followed by reducing calcination in an atmosphere comprising hydrogen and nitrogen in a volume % of 2–100:98–0 at a temperature of from 80 to 450° C.

Further, the electro-conductive oxide particle (6) comprising indium atoms, niobium atoms, antimony atoms and oxygen atoms is obtained by a process which comprises mixing an indium compound, a niobium compound and an antimony compound in a molar ratio of (Nb+Sb)/In of from 0.01 to 0.10 and in a molar ratio of Sb/(Nb+Sb) of from 0.01 to 0.99, and calcining the mixture at a temperature of from 500 to 900° C., followed by reducing calcination in an atmosphere comprising hydrogen and nitrogen in a volume % of 2–100:98–0 at a temperature of from 80 to 450° C.

As the indium compound to be used in the present invention, a mono- to tri-valent indium compound may be used, and at least one indium compound selected from the group consisting of indium hydroxide, indium oxide, an indium salt of inorganic acid, an indium salt of organic acid and an organic indium compound may be used.

The indium salt of inorganic acid may, for example, be indium nitrate, indium chloride, indium sulfate or indium sulfamate. The indium salt of organic acid may, for example, be indium oxalate. The organic indium compound may, for example, be an alkoxide of indium, such as triethoxyindium. These indium compounds may be those commercially available as industrial chemicals. However, in a case of using an indium salt, preferred are salts having an acid which is readily volatile by calcining, such as a nitrate, a chloride and an organic acid salt. Among them, particularly preferred is indium chloride, and this may be used alone or as a mixture. These indium compounds may be employed in a form of a liquid dissolved or dispersed in an aqueous solution or in an organic solvent, or in a powder form.

As the niobium compound to be used in the present invention, a tri- to penta-valent niobium compound may be used, and at least one niobium compound selected from the group consisting of niobium oxide, a niobium salt of inorganic acid, niobate, a niobium salt of organic acid and an organic niobium compound may be used.

The niobium salt of inorganic acid may, for example, be niobium pentachloride or niobium oxychloride. The niobate may, for example, be a potassium salt of niobium, a rubidium salt of niobium or a cesium salt of niobium. The niobium salt of organic acid may, for example, be niobium hydrogenoxalate. The organic niobium compound may, for example, be an alkoxide of niobium, such as pentaethoxyniobium. These niobium compounds may be those commercially available as industrial chemicals. However, in a case of using a niobium salt, preferred are salts having an acid which is readily volatile by calcining, such as a hydrochloride and an organic acid salt. Among them, particularly preferred are niobium pentachloride and hexapotassium octaniobate, and they may be used alone or as a mixture. These niobium compounds may be employed in the form of a liquid dissolved or dispersed in an aqueous solution or in an organic solvent, or in a powder form. Here, a water-soluble hexapotassium octaniobate can be obtained by making eutectic mixture of niobium pentaoxide with an excess of potassium carbonate.

As the antimony compound to be used in the present invention, a tri- to penta-valent antimony compound may be used, and at least one antimony compound selected from the group consisting of antimony oxide, an antimony salt of inorganic acid, an antimonate, an antimony salt of organic acid and an organic antimony compound may be employed.

The antimony salt of inorganic acid may, for example, be antimony nitrate, basic antimony nitrate, antimony chloride, antimony oxychloride or antimony sulfate. The antimonate may, for example, be potassium antimonate. The antimony salt of organic acid may, for example, be potassium antimony oxalate. The organic antimony compound may, for example, be an alkoxide of antimony, such as triethoxyantimony. These antimony compounds may be those commercially available as industrial chemicals. However, in a case of using an antimony salt, preferred is a salt having an acid which is readily volatile by calcining, such as a nitrate, a hydrochloride or an organic acid salt. Among them, particularly preferred are antimony chloride and potassium antimonate, and they may be used alone or as a mixture. These antimony compounds may be employed in the form of a liquid dissolved or dispersed in an aqueous solution or in an organic solvent, or in a powder form.

In a case where either of the indium compound and the niobium compound, or any of these compounds and the antimony compound, is a solution, mixing may be carried out by means of an apparatus such as a Satake-type stirrer, a Pfaudler-type stirrer or a disper at a mixing temperature of from 0 to 100° C. for a mixing time of from 0.1 to 30 hours.

In a case where both the indium compound and the niobium compound or all of these compounds and the antimony compound are in a powder form, mixing may be carried out by an apparatus such as a mortar, a V-type mixer, a Henschel mixer or a ball mill.

It is particularly preferred to mix a water-soluble indium compound, a water-soluble niobium compound and a water-soluble antimony compound. In such a case, the mixing temperature may be from 0 to 100° C. However, the higher the temperature during the mixing, the larger the particle diameter of the electro-conductive oxide particle to be formed, and the more the transparency during dispersion tends to decrease, and accordingly the mixing temperature is preferably low, and the mixing is carried out preferably from 0 to 50° C.

Further, at the time of such mixing, the pH of the mixture can be controlled, as the case requires, with ammonia, hydroxide of an alkali metal, an organic base such as guanidine hydroxide, an inorganic acid such as hydrochloric acid or nitric acid or an organic acid such as acetic acid. Among them, preferred is hydroxide of an alkali metal, particularly preferred is an aqueous potassium hydroxide solution.

In the present invention, the mixture (slurry) of the indium compound, the niobium compound and the antimony compound may be separated by suction filtration, centrifugal separation or filter press, and soluble impurities derived from the starting material may be removed by washing with water. Here, the washing is carried out until the conductivity of the filtrate becomes at most 1,000 $\mu$S/cm, preferably at most 100 $\mu$S/cm.

The slurry or the cake obtained after the washing can be dried by e.g. a spray dryer, a drum dryer, a box-type hot-air dryer, a vacuum dryer or a freeze drying machine. Here, the drying temperature is not particularly limited, but is preferably at most 300° C. from the viewpoint of the apparatus or operation.

In the present invention, the dried product of the mixture of the indium compound and the niobium compound or the dried product of the mixture of these compounds and the antimony compound is calcined at a calcination temperature of from 500 to 900° C., preferably from 600 to 750° C. for from 0.5 to 50 hours, preferably from 1 to 20 hours. Here, the air may be employed as the calcination atmosphere, but the proportion of oxygen and nitrogen or another inert gas may be changed. By such a calcining, indium oxide and niobium oxide or indium oxide, niobium oxide and antimony oxide are reacted by solid phase reaction to form the electro-conductive oxide particle having a crystal structure of indium oxide.

Further, to obtain an oxide having a higher electrical conductivity, this calcined powder may be subjected to reducing calcination in an atmosphere comprising from 2 to 100 vol %, preferably from 2 to 50 vol %, of hydrogen and nitrogen as the rest at a temperature of from 80 to 450° C., preferably from 100 to 300° C., for from 0.1 to 30 hours, preferably from 0.5 to 10 hours. By carrying out such reducing calcination to form oxygen deficiency in the crystal structure, an electro-conductive oxide particle having an excellent electrical conductivity can be obtained.

The electro-conductive oxide particle of the present invention is yellowish to bluish gray. The X-ray diffraction peaks of the electro-conductive oxide particle having a crystal structure of indium oxide prepared by the above process of the present invention were found to be slightly shifted from the diffraction peaks of pure indium oxide.

Further, as a result of observation by a transmission electron microscope, the electro-conductive oxide particle of the present invention was confirmed to be a particle of a colloidal level with a primary particle diameter of from 2 to 300 nm, preferably from 5 to 50 nm.

Further, the electro-conductive oxide particle of the present invention was confirmed to have excellent electro-conductivity with a specific resistance of from 0.1 to 50 $\Omega$cm when press-molded under a pressure of 300 kg/cm$^2$.

In the present invention, by using the indium compound and the niobium compound, or these compounds and the antimony compound, the reactivity is remarkably high even at a temperature of not higher than 1,000° C., and a uniform phase can be formed, and thus, an oxide having excellent electro-conductivity can be obtained. Further, in the present invention, no calcining is conducted at such a high temperature as exceeding 900° C., and accordingly there will be no growth of particle due to sintering, and the product will be in the form of particles of from 2 to 300 nm. Such particles can readily be dispersed in water and/or an organic solvent to obtain a sol.

In the present invention, in a case where the (Nb+Sb)/In molar ratio exceeds 0.10, impurities are likely to be present in the product, thus decreasing electrical conductivity. Further, if the (Nb+Sb)/In molar ratio is less than 0.01, the strain in the crystal structure of indium oxide tends to be small, and the electrical conductivity tends to decrease.

In the present invention, the mixing time of the indium compound and the niobium compound or these compounds and the antimony compound is from 0.1 to 30 hours. It may be less than 0.1 hour, but such is not desirable since the mixing is likely to be inadequate.

Further, the mixing may be conducted more than 30 hours, but such is not efficient, since the production time will be unnecessarily long. In the present invention, the temperature for calcining the dried product of the mixture of the indium compound and the niobium compound or the dried product of the mixture of the indium compound, the niobium compound and the antimony compound, is from 500 to 900° C. If it is less than 500° C., no adequate solid phase reaction tends to take place, and no electro-conductive oxide particle tends to be obtained. Further, if it is at least 900° C., although the solid phase reaction of indium oxide, niobium oxide and antimony oxide proceeds, particle growth due to sintering tends to take place.

The temperature for reducing calcination which is carried out in an atmosphere comprising from 2 to 100 vol % of hydrogen and nitrogen as the rest to obtain a particle having a higher electro-conductivity, after calcining the dried product of the mixture of the indium compound and the niobium compound or the dried product of the mixture of the indium compound, the niobium compound and the antimony compound at a temperature of from 500 to 900° C., is from 80 to 450° C. If it is less than 80° C., no adequate reduction tends to take place, and no adequate oxygen deficiency tends to be formed. Further, if it exceeds 450° C., the reduction tends to proceed more than necessary, and a mixture of metal indium, metal niobium and metal antimony is likely to form, such being unfavorable.

With respect to the electro-conductive oxide particle having a crystal structure of indium oxide of the present invention, as the starting material, a metal compound comprising indium atoms and antimony atoms, a metal compound comprising indium atoms, antimony atoms and zinc atoms, a metal compound comprising indium atoms and niobium atoms, or a metal compound comprising indium atoms, niobium atoms and antimony atoms, are mentioned. In the processes for producing the electro-conductive oxide particles (1) to (6) of the present invention, the above metal compound and an alkali compound may be mixed in an aqueous medium at a liquid temperature exceeding 10° C. and less than 40° C. to form a slurry of indium hydroxide doped with at least one metal element. The electro-conductive oxide particles (1) to (6) obtained by a production process (1) which comprises this mixing step, drying the slurry and calcining it in the air at a temperature of from 500 to 900° C., followed by reducing calcination, have a spherical or elliptic shape.

Further, in the production process of the electro-conductive oxide particles (1) to (6), the electro-conductive oxide particles (1) to (6) obtained by a production process (2) which comprises contacting the above metal compound with an alkali compound in an aqueous medium at a liquid temperature of from 0 to 10° C. to form a slurry of indium hydroxide doped with at least one metal element, drying the slurry and calcining it in the air at a temperature of from 500 to 900° C., and a production process which further comprises reducing calcination in an atmosphere comprising hydrogen and nitrogen in a volume % of 2–100:98–0 at a temperature of from 80 to 450° C., are stick particles having an aspect ratio of from 2 to 10.

Further, in the production process of the electro-conductive oxide particles (1) to (6), the electro-conductive oxide particles (1) to (6) obtained by a production process (3) which comprises contacting an aqueous medium containing the above metal compound with a heat resistant ion exchange resin under heating at a temperature of from 40 to 100° C., preferably from 60 to 90° C., to form a slurry of indium hydroxide doped with at least one metal element, drying the slurry and calcining it in the air at a temperature of from 500 to 900° C., or a production process which further comprises reducing calcination in an atmosphere comprising hydrogen and nitrogen in a volume % of 2–100:98–0 at a temperature of from 80 to 450° C., are stick particles having an aspect ratio of from 2 to 10.

In the production process (3), the ion exchange resin is a strongly basic ion exchange resin, and DIAION XSA-1200, trade name, manufactured by Mitsubishi Chemical Corporation may, for example, be used. The addition amount of the ion exchange resin to the aqueous medium containing the metal compound is determined by pH of the mixed aqueous medium, and it is preferred to through an ion exchange resin in an amount with which the initial pH during mixing would be from 2 to 4 into the aqueous medium. The aqueous medium containing the metal compound, having an ion exchange resin thrown thereinto, is heated at the above temperature with stirring for from 0.1 to 10 hours to obtain an aqueous medium having a pH of from 2 to 4. The ion exchange resin is separated from the aqueous medium thus obtained by means of e.g. a mesh or filter paper, and an alkali substance such as potassium hydroxide is added thereto to obtain a slurry of indium hydroxide doped with at least one metal element.

The stick particle of the electro-conductive oxide having a crystal structure of indium oxide obtained by the above production process (2) or (3) is useful for production of e.g. ceramic fibers having electro-conductivity, from properties attributable to its shape.

Each of the electro-conductive oxide particles (1) to (6) obtained by the present invention can readily be made into an aqueous sol or an organic solvent sol by wet-pulverization in water or in an organic solvent by e.g. a sand grinder, a ball mill, a homogenizer, a disper, a colloid mill, an ultrasonic homogenizer or a high pressure homogenizer.

In the present invention, the obtained aqueous sol of each of the electro-conductive oxide particles (1) to (6) may be contacted with an ion exchange resin, as the case requires, to remove impurity ions to obtain an aqueous sol of the electro-conductive oxide particle having a high purity.

When each of the electro-conductive oxide particles (1) to (6) of the present invention is wet-pulverized to form an aqueous sol or an organic solvent sol, ammonia, a hydroxide of an alkali metal, a ketone such as acetone, methyl ethyl ketone or diacetone alcohol, β-diketone such as acetyl acetone or acetonyl acetone, an ester such as acetoacetic ester, lactate, 2-methoxyethyl acetate or 2-ethoxyethyl acetate, ethers such as methylcellosolve, ethylcellosolve, butylcellosolve or propylene glycol monomethyl ether, a heterocyclic compound such as furfuryl alcohol or tetrahydrofurfuryl alcohol N-methylpyrrolidone, an inorganic acid such as hydrochloric acid or nitric acid, or an oxycarboxylic acid such as lactic acid, tartaric acid, malic acid or citric acid, may, for example, be used for stabilization as the case requires. Further, as the organic solvent, an alcohol such as methyl alcohol, ethyl alcohol, propyl alcohol or butyl alcohol, a glycol such as ethylene glycol, diethylene glycol or hexylene glycol, or an ether such as methyl cellosolve or ethyl cellosolve may be employed.

In the present invention, an organic solvent sol may be obtained by replacement by the above-described organic solvent after an aqueous sol of each of the electro-conductive oxide particles (1) to (6) is obtained. The particle diameter of the aqueous sol or the organic solvent sol of each of the electro-conductive oxide particles (1) to (6) is at most 300 nm as a result of observation by a transmission electron microscope.

The electro-conductive oxide particles (1) to (6) of the present invention are useful as a transparent antistatic agent, a coating agent having antistatic properties, a transparent electromagnetic wave-shielding agent or an electroviscous fluid, by mixing them with a silicon compound, an active energy ray polymerized-type methacrylate, a resin emulsion, a water-soluble high polymer liquid, a silicone oil or a coating.

The silicon compound contains the following component A and/or component B for example.

Component A: an organic silicon compound or a hydrolyzed product thereof represented by the general formula (I):

$(R^1)_a(R^3)_b Si(OR^2)_{4-(a+b)}$ (I)

wherein each of $R^1$ and $R^3$ is an organic group selected from the group consisting of an alkyl group, an alkenyl group, an aryl group, an acyl group, a halogen atom, a glycidoxy group, an epoxy group, an amino group, a phenyl group, a mercapto group, a methacryloxy group and a cyano group, $R^2$ is an organic group selected from the group consisting of an $C_{1-8}$ alkyl group, an alkoxy group, an acyl group and a phenyl group, and each of a and b is an integer of 0 or 1;

Component B: an organic silicon compound or a hydrolyzed product thereof represented by the general formula (II):

$\{(OX)_{3-a}Si(R^4)\}_2 Y$ (II)

wherein $R^4$ is a $C_{1-5}$ organic group, X is a $C_{1-4}$ alkyl group or a $C_{1-4}$ acyl group, Y is a $C_{2-20}$ organic group, and a is an integer of 0 or 1.

The component A is represented by the above-described general formula (I), and specific examples of the organic silicon compound or a hydrolyzed product thereof include methylsilicate, ethylsilicate, n-propylsilicate, iso-propylsilicate, n-butylsilicate, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glucidoxymethyltrimethoxysilane, glycidoxymethyltrimethoxysilane, α-glycidoxyethyltrimethoxysilane, α-glycidoxytriethoxysilane, β-glycidoxytrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δglycidoxybutyltrimethoxysilane, δ-glycidoxybutyltriethoxysilane, (3,4-epoxycyclohexyl)methyltrinethoxysilane, (3,4-epoxycyclohexyl)methyltriethoxysilare, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldiethoxysilane, γ-glycidoxypropylethyldiethoxysilane, γ-glycidoxypropylvinyl methoxysilane, γ-glycidoxypropylvinyl ethoxysilane, γ-glycidoxypropylvinyl phenylmethoxysilane, γ-glycidoxypropylvinyl phenylethoxysilane, ethyltrimethoxysilane, ethyltriethoxysilane, vinyl trimethoxysilane, vinyl triacetoxysilane, vinyl trimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl) γ-aminopropyltrimethoxysilane, N-(β-aminoethyl) γ-aminopropylmethyldimethoxysilane, γ-aminopropylmethyltrimethoxysilane, N-(β-aminoethyl) γ-aminopropyltriethoxysilane, N-(β-aminoethyl) γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyl dimethoxysilane, methylvinyl diethoxysilane and hydrolyzed products thereof.

Now, the component B will be explained. The component B is represented by the above-described general formula (II), and specific examples of the organic silicon compound or a hydrolyzed product thereof include methylene bismethyldimethoxysilane, ethylene bisethyldimethoxysilane, propylene bisethyldiethoxysilane, butylene bismethyldiethoxysilane and hydrolyzed products thereof.

The organic silicon compound as the component A or B may be used alone as the component A or as the component B, or the components A and B may be mixed. Further, as a matter of course, it is possible to use at least two types of the component A or at least two types of the component B.

Hydrolysis of the organic silicon compound as the component A or B may be carried out by adding an acidic aqueous solution such as an aqueous hydrochloric acid solution, an aqueous sulfuric acid solution or an aqueous acetic acid solution to the organic silicon compound as the component A or B, followed by stirring.

The active energy ray polymerized-type methacrylate may be an optional ultraviolet or electron radiation curing methacrylate having at least one methacryloyl group in its molecule, and such a compound may be used alone or as a mixture. Specific examples of the methacrylate include 2-hydroxyethyl methacrylate, 2-hydroxypropyl methacrylate, isobutyl methacrylate, t-butyl methacrylate, isobutyl methacrylate, 2-ethylhexylmethacrylate, stearyl acrylate, 2-ethylhexylcarbitol acrylate, ω-carboxypolycaprolactone monoacrylate, acryloyloxyethylic acid, acrylic acid dimer, lauryl methacrylate, 2-methoxyethyl acrylate, butoxyethyl acrylate, ethoxyethoxyethyl acrylate, methoxytriethyleneglycol acrylate, methoxypolyethyleneglycol acrylate, stearyl methacrylate, cyclohexyl methacrylate, tetrahydrofurfuryl methacrylate, N-vinyl-2-pyrrolidone, isobonyl methacrylate, dicyclopentenyl acrylate, benzyl acrylate, phenyl glycidyl ether epoxy acrylate, phenoxyethyl methacrylate, phenoxypolyethyleneglycol acrylate, nonylphenol ethoxylated acrylate, acryloyloxyethyl phthalic acid, tribromophenyl acrylate, tribromophenol ethoxylated methacrylate, methyl methacrylate, tribromophenyl methacrylate, methacryloyloxy ethylic acid, methacryloyloxy ethyl maleic acid, methacryloyloxy ethyl phthalic acid, polyethyleneglycol methacrylate, polypropyleneglycol methacrylate, β-carboxyethyl acrylate, N-methylolacrylamide, N-methoxymethylacrylamide, N-ethoxymethylacrylamide, N-n-butoxymethylacrylamide, t-butylacrylamide sulfonic acid, vinyl stearate, N-methylacrylamide, N-dimethylacrylamide, N-dimethylaminoethyl methacrylate, N-dimethylaminopropyl acrylamide, acryloyl morpholine, glycidyl methacrylate, n-butyl methacrylate, ethyl methacrylate, allyl methacrylate, cetyl methacrylate, pentadecyl methacrylate, methoxypolyethyleneglycol methacrylate, diethylaminoethyl methacrylate, methacryloyl oxyethyl succinic acid, hexanediol diacrylate, neopentylglycol diacrylate, triethyleneglycol diacrylate, polyethyleneglycol diacrylate, polypropyleneglycol diacrylate, neopentyl hydroxypivalate, pentaerythritol diacrylate monostearate, glycol diacrylate, 2-hydroxyethyl methacryloyl phosphate, bisphenol A ethylene glycol addition product acrylate, bisphenol F ethylene glycol addition product acrylate, tricyclodecane methanol diacrylate, trishydroxyethylisocyanurate diacrylate, 2-hydroxy-1-acryloxy-3-methacryloxypropane, trimethylolpropane triacrylate, trimethylolpropane ethylene glycol addition product triacrylate, trimethylolpropane propylene glycol addition product triacrylate, pentaerythritol triacrylate, trisacryloyloxyethylphosphate, trishydroxyethylisocyanurate triacrylate, modified ε-caprolactone triacrylate, trimethylolpropane ethoxy triacrylate, glycerin propylene glycol addition product trisacrylate, pentaerythritol tetraacrylate, pentaerythritol ethylene glycol addition product tetraacrylate, ditrimethylolpropane tetraacrylate, dipentaerythritol hexapentaacrylate, dipentaerythritol monohydroxypentaacrylate, urethane acrylate, epoxide acrylate, polyester acrylate and unsaturated polyester. However, it is not limited to such specific examples. They may be used alone or as optionally mixed. However, preferred is a multifunctional methacrylate monomer having at least two methacryloyl groups in its molecule or an oligomer, since the film after the polymerization tends to be hard, and the abrasion resistance tends to be good.

Now, the present invention will be explained in further detail with reference to Examples. However, it should be understood that the present invention is by no means restricted to such specific Examples.

PREPARATION EXAMPLE 1

Preparation of an Aqueous Indium/antimony Chloride Solution as a Starting Material 350.0 g of 35% hydrochloric acid was diluted with 50.0 g of water, 29.3 g of diantimony trioxide (manufactured by Mikuni Smelting & Refining Co., Ltd.) was added thereto, and the mixture was heated to 90 to 100° C. and reacted for 30 minutes to obtain an aqueous antimony trichloride solution. 68.0 g of a 10% hydrogen peroxide aqueous solution was added thereto at room temperature with stirring, the mixture was heated to 90 to 100° C. and reacted for 30 minutes, and then 91.9 g of a 48% indium trichloride aqueous solution (manufactured by Indium Corp.) was added thereto, and the mixture was reacted further for one hour to obtain an aqueous indium/antimony chloride solution (a hydrochloric acid aqueous solution of indium trichloride and antimony pentachloride). The obtained aqueous solution had a concentration of 11.0 wt % as $In_2O_3 \cdot Sb_2O_5$.

PREPARATION EXAMPLE 2

Preparation of an Aqueous Potassium Antimonate Solution as a Starting Material 45.3 g of diantimony trioxide (manufactured by Mikuni Smelting & Refining Co., Ltd.) was dispersed in 258.0 g of a 6.7% potassium hydroxide aqueous solution, 30.0 g of a 35% hydrogen peroxide aqueous solution was added thereto, and the mixture was heated to 90 to 100° C. and reacted for 30 minutes to obtain an aqueous potassium antimonate solution. The obtained aqueous solution had a concentration of 16.4 wt % as $KSbO_3$.

PREPARATION EXAMPLE 3

Preparation of an Aqueous Zinc/indium/antimony Chloride Solution as a Starting Material 350.0 g of 35% hydrochloric acid was diluted with 50.0 g of water, 29.3 g of diantimony trioxide (manufactured by Mikuni Smelting & Refining Co., Ltd.) was added thereto, and the mixture was heated to 90 to 100° C. and reacted for 30 minutes to obtain an aqueous antimony trichloride solution. 68.0 g of a 10% hydrogen peroxide aqueous solution was added thereto with stirring at room temperature, and the mixture was heated to 90 to 100° C. and reacted for 30 minutes, and then 4.1 g of zinc oxide (manufactured by Sakai Chemical Industry Co., Ltd.) and 45.9 g of a 48% indium trichloride aqueous solution (manufactured by Indium Corp.) were added thereto, and the mixture was reacted further for one hour to obtain an aqueous zinc/indium/antimony chloride solution (hydrochloric acid aqueous solution of zinc chloride, indium trichloride and antimony pentachloride). The obtained aqueous solution had a concentration of 10.7 wt % as $\{(ZnO)_{1/2}(In_2O_3)_{1/2}\} \cdot Sb_2O_5$.

PREPARATION EXAMPLE 4

Preparation of a Mixed Aqueous Solution of a Potassium Salt of Niobic Acid and Potassium Carbonate as a Starting Material 52.0 g of diniobium pentaoxide (manufactured by Junsei Chemical Co., Ltd.) and 128.0 g of potassium carbonate were weighed in an alumina crucible, they were heated to 800° C. and reacted for 15 hours, and then heated to 900° C. and reacted for 5 hours, followed by cooling. 156.7 g of the obtained solid material was dissolved in water, the solution was stirred for 3 hours under heating to 90 to 100° C., and the obtained aqueous solution was subjected to filtration to obtain a mixed aqueous solution of a potassium salt of niobic acid (considered to be hexapotassium octaniobate) and potassium carbonate. The obtained aqueous solution had a concentration of 4.88 wt % as $Nb_2O_5$ and a concentration of 12.05 wt % as $K_2CO_3$.

EXAMPLE 1

630.8 g of water was added to 361.1 g of a 48% indium trichloride aqueous solution (manufactured by Indium Corp.) for dilution, and 116.2 g of the aqueous indium/antimony chloride solution prepared in Preparation Example 1 was added thereto with stirring at room temperature. Then, 1,812.8 g of a 10% potassium hydroxide aqueous solution was added thereto, followed by reaction for one hour to obtain an antimony-doped indium hydroxide slurry. This slurry had an $In_2O_3$ concentration of 3.9 wt %, an $Sb_2O_5$ concentration of 0.2 wt %, and a molar ratio of 0.05 as calculated as $Sb_2O_5/In_2O_3$.

This slurry was subjected to filtration, followed by washing with water until the conductivity of the filtrate became at most 100 μS/cm to obtain 242.9 g of a wet cake.

569.1 g of water was added to this wet cake, followed by stirring for 5 hours, and the slurry thus obtained was evaporated to dryness by a hot air dryer at 110° C. to obtain 146.0 g of a dried product. This dried product was pulverized in a mortar to obtain a powder, which was put in an alumina crucible and calcined in the air by an electric furnace at a temperature of 650° C. over a period of 2 hours to obtain 121.8 g of a powder. This powder was yellowish green and as a result of X-ray diffraction, diffraction peaks slightly shifted from diffraction peaks of indium oxide ($In_2O_3$) of ASTM were found.

This powder had a specific surface area of 51.4 m²/g as measured by a BET method and a particle diameter of 16.7 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm², and the press-molded product showed an electro-conductivity with a specific resistance of 1.5 Ωcm.

The obtained calcined powder was put in a glass calcination tube and subjected to reducing calcination in an atmosphere comprising 20 vol % of hydrogen and nitrogen as the rest at a temperature of 140° C. over a period of 2 hours. This powder was bluish green and as a result of X-ray diffraction, diffraction peaks slightly shifted from diffraction peaks of indium oxide ($In_2O_3$) of ASTM were found.

This powder had a specific surface area of 51.4 m$^2$/g as measured by a BET method and a particle diameter of 16.7 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm$^2$, and the press-molded product showed an electro-conductivity with a specific resistance of 0.5 Ωcm.

This powder was analyzed by fluorescent X-rays. As a result of the analysis, the Sb$_2$O$_5$ content was 4.9 wt %, the In$_2$O$_3$ content was 95.1 wt %, and the molar ratio was 0.05 as calculated as Sb$_2$O$_5$/In$_2$O$_3$.

5.0 g of this powder was dispersed in 20 g of water, followed by irradiation with ultrasonic waves to obtain 21.5 g of a sol having antimony-doped indium oxide particles dispersed in an aqueous medium. This aqueous sol had transparency and was bluish green, and had a specific gravity of 1.246, a pH of 3.59, a viscosity of 2.1 mPa·s, a conductivity of 475 μS/cm, a concentration of antimony-doped indium oxide particles of 23.2 wt %, an average particle diameter of 139 nm as measured by a dynamic light scattering method, a particle diameter of 16.7 nm as measured by a BET method, primary particle diameters of from 10 to 30 nm as measured by a transmission electron microscopic observation and an average particle diameter of 0.09 μm as measured by a centrifugal sedimentation method.

This sol was stable without formation of a precipitate or abnormality such as gelation, even when left to stand at 50° C. for one month. This sol was coated on a glass sheet by an applicator and dried at 200° C. to form a conductive film of about 2 μm. The transmittance of the coated film was 99%, thus showing excellent transparency. Further, the sheet resistance value was measured and found to be 3×10$^4$ Ω/□.

124.8 g of the above aqueous sol was put in an eggplant-type flask and subjected to a solvent substitution in a rotary evaporator while charging 2.5 l of methanol under reduced pressure, to obtain 172.5 g of a methanol sol having antimony-doped indium oxide particles dispersed in methanol. This methanol sol had a specific gravity of 0.894, a pH (measured as diluted with an equal weight of water) of 4.75, a viscosity of 1.6 mPa·s, a conductivity (measured as diluted with an equal weight of water) of 23 μS/cm, an antimony-doped indium oxide concentration of 13.3 wt %, an average particle diameter of 147 nm as measured by a dynamic light scattering method, a particle diameter of 16.7 nm as measured by a BET method, primary particle diameters of from 10 to 30 nm as measured by transmission electron microscopic observation, an average particle diameter of 0.11 μm as measured by a centrifugal sedimentation method, and a transmittance of 20% when adjusted to a concentration of 0.2%.

To 88.7 g of the above methanol sol, 0.4 g of acetyl acetone (2.4-pentadione) was added, followed by stirring for 10 minutes and irradiation with ultrasonic waves for 20 minutes, to obtain 89.0 g of a stabilized methanol sol. This stabilized methanol sol had a specific gravity of 0.897, a pH (measured as diluted with an equal weight of water) of 4.66, a viscosity of 1.4 mPa·s, a conductivity (measured as diluted with an equal weight of water) of 31 μS/cm, an antimony-doped indium oxide concentration of 13.4 wt %, an average particle diameter of 131 nm as measured by a dynamic light scattering method, a particle diameter of 16.7 nm as measured by a BET method, primary particle diameters of from 10 to 30 nm as measured by transmission electron microscopic observation, an average particle diameter of 0.11 μm as measured by a centrifugal sedimentation method, and a transmittance of 37% when adjusted to a concentration of 0.2%.

EXAMPLE 2

665.3 g of water was added to 380.2 g of a 48% indium trichloride aqueous solution (manufactured by Indium Corp.) for dilution, and 41.7 g of the aqueous potassium antimonate solution prepared in Preparation Example 2 was added thereto with stirring at room temperature. Then, 1,446.4 g of a 10% potassium hydroxide aqueous solution was added thereto, followed by reaction for one hour to obtain an antimony-doped indium hydroxide slurry. This slurry had an In$_2$O$_3$ concentration of 4.5 wt %, an Sb$_2$O$_5$ concentration of 0.3 wt %, and a molar ratio of 0.05 as calculated as Sb$_2$O$_5$/In$_2$O$_3$.

This slurry was subjected to filtration, followed by washing with water until the conductivity of the filtrate became at most 100 μS/cm to obtain 272.6 g of a wet cake.

539.8 g of water was added to this wet cake, followed by stirring for 5 hours, and the slurry thus obtained was evaporated to dryness by a hot air dryer at 110° C. to obtain 146.0 g of a dried product. This dried product was pulverized in a mortar to obtain a powder, which was put in an alumina crucible and calcined in the air by an electric furnace at a temperature of 650° C. over a period of 2 hours to obtain 121.8 g of a powder. This powder was yellowish green and as a result of X-ray diffraction, diffraction peaks slightly shifted from diffraction peaks of indium oxide (In$_2$O$_3$) of ASTM were found.

This powder had a specific surface area of 44.4 m$^2$/g as measured by a BET method and a particle diameter of 19.3 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm$^2$, and the press-molded product showed an electro-conductivity with a specific resistance of 2.5 Ωcm.

The obtained calcined powder was put in a glass calcination tube and subjected to reducing calcination in an atmosphere comprising 20 vol % of hydrogen and nitrogen as the rest at a temperature of 140° C. over a period of 2 hours. This powder was bluish green and as a result of X-ray diffraction, diffraction peaks slightly shifted from diffraction peaks of indium oxide (In$_2$O$_3$) of ASTM were found.

This powder had a specific surface area of 44.4 m$^2$/g as measured by a BET method and a particle diameter of 19.3 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm$^2$, and the press-molded product showed an electro-conductivity with a specific resistance of 0.9 Ωcm.

This powder was analyzed by fluorescent X-rays. As a result of the analysis, the Sb$_2$O$_5$ content was 4.9 wt %, the In$_2$O$_3$ content was 95.1 wt %, and the molar ratio was 0.05 as calculated as Sb$_2$O$_5$/In$_2$O$_3$.

EXAMPLE 3

705.8 g of water was added to 403.3 g of a 48% indium trichloride aqueous solution (manufactured by Indium Corp.) for dilution, and 127.2 g of the aqueous zinc/indium/antimony chloride solution prepared in Preparation Example 3 was added thereto with stirring at room temperature. Then, 2,002.1 g of a 10% potassium hydroxide aqueous solution was added thereto, followed by reaction for one hour to obtain a zinc- and antimony-doped indium hydroxide slurry. This slurry had a ZnO concentration of 0.1 wt %, an $In_2O_3$ concentration of 5.1 wt %, an $Sb_2O_5$ concentration of 0.3 wt %, and a molar ratio of 0.02/0.05/1 as calculated as $ZnO/Sb_2O_5/In_2O_3$.

This slurry was subjected to filtration, followed by washing with water until the conductivity of the filtrate became at most 100 μS/cm to obtain 303.8 g of a wet cake.

600.2 g of water was added to this wet cake, followed by stirring for 5 hours, and the slurry thus obtained was evaporated to dryness by a hot air dryer at 110° C. to obtain 164.0 g of a dried product. This dried product was pulverized in a mortar to obtain a powder, which was put in an alumina crucible and calcined in the air by an electric furnace at a temperature of 650° C. over a period of 2 hours to obtain 135.6 g of a powder. This powder was yellowish green and as a result of X-ray diffraction, diffraction peaks slightly shifted from diffraction peaks of indium oxide ($In_2O_3$) of ASTM were found.

This powder had a specific surface area of 42.6 m$^2$/g as measured by a BET method and a particle diameter of 20.1 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm$^2$, and the press-molded product showed an electro-conductivity with a specific resistance of 1.5 Ωcm.

The obtained calcined powder was put in a glass calcination tube and subjected to reducing calcination in an atmosphere comprising 20 vol % of hydrogen and nitrogen as the rest at a temperature of 140° C. over a period of 2 hours. This powder was bluish green and as a result of X-ray diffraction, diffraction peaks slightly shifted from diffraction peaks of indium oxide ($In_2O_3$) of ASTM were found.

This powder had a specific surface area of 42.6 m$^2$/g as measured by a BET method and a particle diameter of 20.1 nm as calculated from the specific surface area. Further, from transmission electron microscopic observation, the powder consisted of elliptic colloidal particles having primary particle diameters of from 10 to 30 nm. This powder was press-molded under a pressure of 300 kg/cm$^2$, and the press-molded product showed an electro-conductivity with a specific resistance of 1.0 Ωcm.

This powder was analyzed by fluorescent X-rays. As a result of the analysis, the ZnO content was 0.7%, the $Sb_2O_5$ content was 5.6 wt %, the $In_2O_3$ content was 93.7 wt %, and the molar ratio was 0.02/0.05/1 as calculated as $ZnO/Sb_2O_5/In_2O_3$.

EXAMPLE 4

The same operation as in Example 1 was carried out except that the molar ratio was 0.03 as calculated as $Sb_2O_5/In_2O_3$.

EXAMPLE 5

The same operation as in Example 1 was carried out except that the molar ratio was 0.06 as calculated as $Sb_2O_5/In_2O_3$.

EXAMPLE 6

The same operation as in Example 1 was carried out except that the molar ratio was 0.08 as calculated as $Sb_2O_5/In_2O_3$.

EXAMPLE 7

The same operation as in Example 3 was carried out except that the molar ratio was 0.05/0.05/1 as calculated as $ZnO/Sb_2O_5/In_2O_3$.

EXAMPLE 8

3,790 g of water was added to 2,166.3 g of a 48% indium trichloride aqueous solution (manufactured by Indium Corp.) for dilution, and 750.1 g of the aqueous indium/antimony chloride solution prepared in Preparation Example 1 was added thereto with stirring at a liquid temperature of from 0 to 5° C. Then, 11.3 kg of a 10% potassium hydroxide aqueous solution was added thereto, followed by reaction for one hour at a liquid temperature of from 0 to 5° C. to obtain an antimony-doped indium hydroxide slurry. This slurry had an $In_2O_3$ concentration of 3.9 wt %, an $Sb_2O_5$ concentration of 0.2 wt %, and a molar ratio of 0.05 as calculated as $Sb_2O_5/In_2O_3$.

This slurry was subjected to filtration, followed by washing with water until the conductivity of the filtrate became at most 100 μS/cm to obtain a wet cake.

Water was added to this wet cake to make the total amount 8.74 kg, followed by stirring for 5 hours, and the slurry thus obtained was evaporated to dryness by a hot air dryer at 110° C. to obtain 876.0 g of a dried product. This dried product was pulverized in a mortar to obtain a powder, which was put in an alumina crucible and calcined in the air by an electric furnace at a temperature of 650° C. over a period of 2 hours to obtain 742.3 g of a powder. This powder was yellowish green and as a result of X-ray diffraction, diffraction peaks slightly shifted from diffraction peaks of indium oxide ($In_2O_3$) of ASTM were found.

This powder had a specific surface area of 42.8 m$^2$/g as measured by a BET method and a particle diameter of 20.0 nm as calculated from the specific surface area. Further, from transmission electron microscopic observation, the powder consisted of stick particles having an average minor axis of from 5 to 10 nm, an average major axis of from 20 to 30 nm and an aspect ratio of from 2 to 6. This powder was press-molded under a pressure of 300 kg/cm$^2$, and the press-molded product showed an electro-conductivity with a specific resistance of 14.7 Ωcm.

The obtained calcined powder was put in a glass calcination tube and subjected to reducing calcination in an atmosphere comprising 20 vol % of hydrogen and nitrogen as the rest at a temperature of 160° C. over a period of 2 hours. This powder was bluish green and as a result of X-ray diffraction, diffraction peaks slightly shifted from diffraction peaks of indium oxide ($In_2O_3$) of ASTM were found.

This powder had a specific surface area of 42.8 m$^2$/g as measured by a BET method and a particle diameter of 20.0 nm as calculated from the specific surface area. Further, from transmission electron microscopic observation, the powder consisted of stick particles having an average minor axis of from 5 to 10 nm, an average major axis of from 20 to 30 nm and an aspect ratio of from 2 to 6. This powder was press-molded under a pressure of 300 kg/cm$^2$, and the press-molded product showed an electro-conductivity with a specific resistance of 1.0 Ωcm.

This powder was analyzed by fluorescent X-rays. As a result of the analysis, the $Sb_2O_5$ content was 5.6 wt %, the $In_2O_3$ content was 94.4 wt %, and the molar ratio was 0.05 as calculated as $Sb_2O_5/In_2O_3$.

EXAMPLE 9

209.7 g of water was added to 120.0 g of a 48% indium trichloride aqueous solution (manufactured by Indium Corp.) for dilution, and 41.2 g of the aqueous indium/antimony chloride solution prepared in Preparation Example 1 was added thereto with stirring at room temperature. Then, 398.3 g of a heat resistant ion exchange resin (DIAION XSA-1200, trade name, manufactured by Mitsubishi Chemical Corporation) was added thereto, followed by reaction for 5 hours at a liquid temperature of 90° C. The heat resistant ion exchange resin was removed from the obtained slurry, and 277.9 g of a 10% potassium hydroxide aqueous solution was added thereto, followed by reaction for one hour to obtain an antimony-doped indium hydroxide slurry. This slurry had an $In_2O_3$ concentration of 3.9 wt %, an $Sb_2O_5$ concentration of 0.2 wt % and a molar ratio of 0.05 as calculated as $Sb_2O_5/In_2O_3$.

This slurry was washed with water by means of ultrafiltration until the conductivity became at most 100 μS/cm to obtain 621.8 g of a washed slurry. The obtained slurry was evaporated to dryness by a hot air dryer at 110° C. to obtain 20.5 g of a dried product. This dried product was pulverized in a mortar to obtain a powder. This powder was put into an alumina crucible and calcined in the air in an electric furnace at a temperature of 650° C. over a period of 2 hours to obtain 17.2 g of a powder. This powder was yellowish green and as a result of the X-ray diffraction, diffraction peaks slightly shifted from diffraction peaks of indium oxide ($In_2O_3$) of ASTM were found.

This powder had a specific surface area of 41.3 $m^2/g$ as measured by a BET method and a particle diameter of 20.7 nm as calculated from the specific surface area. Further, from transmission electron microscopic observation, this powder was a mixture comprising elliptic colloidal particles having primary particle diameters of from 10 to 30 nm and stick particles having an average minor axis of from 5 to 10 nm, an average major axis of from 20 to 50 nm and an aspect ratio of from 2 to 10. This powder was press-molded under a pressure of 300 $kg/cm^2$, and the press-molded product showed an electro-conductivity with a specific resistance of 900 Ωcm.

The obtained calcined powder was put in a glass calcination tube and subjected to reducing calcination in an atmosphere comprising 20 vol % of hydrogen and nitrogen as the rest at a temperature of 160° C. over a period of 2 hours. This powder was bluish green and as a result of X-ray diffraction, diffraction peaks slightly shifted from diffraction peaks of indium oxide ($In_2O_3$) of ASTM were found.

This powder had a specific surface area of 41.3 $m^2/g$ as measured by a BET method and a particle diameter of 20.7 nm as calculated from the specific surface area. Further, from transmission electron microscopic observation, the powder was a mixture comprising elliptic colloidal particles having primary particle diameters of from 10 to 30 nm and stick particles having an average minor axis of from 5 to 10 nm, an average major axis of from 20 to 50 nm and an aspect ratio of from 2 to 10. This powder was press-molded under a pressure of 300 $kg/cm^2$, and the press-molded product showed an electro-conductivity with a specific resistance of 2.2 Ωcm.

This powder was analyzed by fluorescent X-rays. As a result of the analysis, the $Sb_2O_5$ content was 4.4 wt %, the $In_2O_3$ content was 95.6 wt %, and the molar ratio was 0.04 as calculated as $Sb_2O_5/In_2O_3$.

EXAMPLE 10

352.7 g of water was added to 201.9 g of a 48% indium trichloride aqueous solution (manufactured by Indium Corp.) for dilution, and 57.9 g of the aqueous zinc/indium/antimony chloride solution prepared in Preparation Example 3 was added thereto with stirring at room temperature. Then, 625.0 g of a heat resistant ion exchange resin (DIAION XSA-1200, trade name, manufactured by Mitsubishi Chemical Corporation) was added thereto, followed by reaction for 5 hours at a liquid temperature of 90° C. The heat resistant ion exchange resin was removed from the obtained slurry, and 497.5 g of a 10% potassium hydroxide aqueous solution was added thereto, followed by reaction for one hour to obtain a zinc- and antimony-doped indium hydroxide slurry. This slurry had a ZnO concentration of 0.1 wt %, an $In_2O_3$ concentration of 5.1 wt %, an $Sb_2O_5$ concentration of 0.3 wt % and a molar ratio of 0.02/0.05/1 as calculated as $ZnO/Sb_2O_5/In_2O_3$.

This slurry was washed with water by means of ultrafiltration until the conductivity became at most 100 μS/cm to obtain 422.8 g of a washed slurry. The obtained slurry was evaporated to dryness by a hot air dryer at 110° C. to obtain 47.5 g of a dried product. This dried product was pulverized in a mortar to obtain a powder. This powder was put into an alumina crucible and calcined in the air in an electric furnace at a temperature of 650° C. over a period of 2 hours to obtain 31.8 g of a powder. This powder was yellowish green and as a result of the X-ray diffraction, diffraction peaks slightly shifted from diffraction peaks of indium oxide ($In_2O_3$) of ASTM were found.

This powder had a specific surface area of 32.1 $m^2/g$ as measured by a BET method and a particle diameter of 26.7 nm as calculated from the specific surface area. Further, from transmission electron microscopic observation, this powder was a mixture comprising elliptic colloidal particles having primary particle diameters of from 10 to 30 nm and stick particles having an average minor axis of from 5 to 10 nm, an average major axis of from 20 to 50 nm and an aspect ratio of from 2 to 10. This powder was press-molded under a pressure of 300 $kg/cm^2$, and the press-molded product showed an electro-conductivity with a specific resistance of 25.3 Ωcm.

The obtained calcined powder was put in a glass calcination tube and subjected to reducing calcination in an atmosphere comprising 20 vol % of hydrogen and nitrogen as the rest at a temperature of 160° C. over a period of 2 hours. This powder was bluish green and as a result of X-ray diffraction, diffraction peaks slightly shifted from diffraction peaks of indium oxide ($In_2O_3$) of ASTM were found.

This powder had a specific surface area of 32.1 $m^2/g$ as measured by a BET method and a particle diameter of 26.7 nm as calculated from the specific surface area. Further, from transmission electron microscopic observation, the powder was a mixture comprising elliptic colloidal particles having primary particle diameters of from 10 to 30 nm and stick particles having an average minor axis of from 5 to 10 nm, an average major axis of from 20 to 50 nm and an aspect ratio of from 2 to 10. This powder was press-molded under a pressure of 300 $kg/cm^2$, and the press-molded product showed an electro-conductivity with a specific resistance of 2.7 Ωcm.

This powder was analyzed by fluorescent X-rays. As a result of the analysis, the ZnO content was 0.30 wt %, the $Sb_2O_5$ content was 5.44 wt %, the $In_2O_3$ content was 94.26 wt %, and the molar ratio was 0.01/0.05/1 as calculated as $ZnO/Sb_2O_5/In_2O_3$.

EXAMPLE 11

74.8 g of 10% hydrochloric acid and 586.0 g of water were added to 384.6 g of a 47.6% indium trichloride aqueous solution (manufactured by Indium Corp.) for dilution, and 115.6 g of the aqueous potassium niobate solution prepared in Preparation Example 4 was added thereto with stirring at room temperature. Then, 1,400 g of a 10% potassium hydroxide aqueous solution was added thereto, followed by reaction for one hour to obtain a niobium-doped indium hydroxide slurry. This slurry had an $In_2O_3$ concentration of 4.5 wt %, an $Nb_2O_5$ concentration of 0.2 wt %, and a molar ratio as calculated as $Nb_2O_5/In_2O_3$ i.e. an Nb/In molar ratio of 0.051.

This slurry was subjected to filtration, followed by washing with water until the conductivity became at most 100 $\mu$S/cm to obtain 254.4 g of a wet cake.

549.9 g of water was added to this wet cake, followed by stirring for 5 hours, and the obtained slurry was evaporated to dryness by a hot air dryer at 110° C. to obtain 145.0 g of a dried product. This dried product was pulverized in a mortar to obtain a powder. This powder was put in an alumina crucible and calcined in the air in an electric furnace at a temperature of 650° C. over a period of 2 hours to obtain 120.6 g of a powder. This powder was yellowish and as a result of X-ray diffraction, diffraction peaks slightly shifted from diffraction peaks of indium oxide ($In_2O_3$) of ASTM were found.

The powder had a specific surface area of 20.9 $m^2/g$ as measured by a BET method and a particle diameter of 41.0 nm as calculated from the specific surface area. Further, from transmission electron microscopic observation, the powder consisted of elliptic colloidal particles having primary particle diameters of from 10 to 50 nm. This powder was press-molded under a pressure of 300 $kg/cm^2$, and the press-molded product showed substantially no electro-conductivity.

The obtained calcined powder was put in a glass calcination tube and subjected to reducing calcination in an atmosphere comprising 20 vol % of hydrogen and nitrogen as the rest at a temperature of 350° C. over a period of 2 hours. This powder was bluish gray and as a result of X-ray diffraction, diffraction peaks slightly shifted from diffraction peaks of indium oxide ($In_2O_3$) of ASTM were found.

The powder had a specific surface area of 20.9 $m^2/g$ as measured by a BET method and a particle diameter of 41.0 nm as calculated from the specific surface area. Further, from transmission electron microscopic observation, the powder consisted of elliptic colloidal particles having primary particle diameters of from 10 to 50 nm. This powder was press-molded under a pressure of 300 $kg/cm^2$, and the press-molded product showed an electro-conductivity with a specific resistance of 0.17 $\Omega$cm.

This powder was analyzed by fluorescent X-rays. As a result of the analysis, the $Nb_2O_5$ content was 4.5 wt %, the $In_2O_3$ content was 95.5 wt %, and the molar ratio as calculated as $Nb_2O_5/In_2O_3$ i.e. Nb/In molar ratio was 0.051.

EXAMPLE 12

57.8 g of the aqueous potassium niobate solution prepared in Preparation Example 4 and 20.9 g of the aqueous potassium antimonate solution prepared in Preparation Example 2 were stirred to obtain 78.7 g of a mixed solution having a molar ratio of $Sb_2O_5/(Nb_2O_5+Sb_2O_5)$ i.e. an Sb/(Nb+Sb) molar ratio of 0.50. Then, 72.9 g of 10% hydrochloric acid and 587.9 g of water were added to 384.6 g of a 48% indium trichloride aqueous solution (manufactured by Indium Corp.) for dilution, and 78.7 g of the prepared potassium niobate/potassium antimonate mixed aqueous solution was added thereto with stirring at room temperature. Then, 1,400 g of a 10% potassium hydroxide aqueous solution was added thereto, followed by reaction for one hour to obtain a slurry of a niobium- and antimony-doped indium hydroxide slurry. This slurry had an $In_2O_3$ concentration of 5.49 wt %, a $Nb_2O_5$ concentration of 0.11 wt %, an $Sb_2O_5$ concentration of 0.13 wt %, and a molar ratio of 0.026/0.026/1 as calculated as $Nb_2O_5/Sb_2O_5/In_2O_3$. This corresponds to a (Nb+Sb)/In molar ratio of 0.052 and an Sb/(Nb+Sb) molar ratio of 0.50.

This slurry was subjected to filtration, followed by washing with water until the conductivity of the filtrate became at most 100 $\mu$S/cm to obtain 264.0 g of a wet cake.

544.4 g of water was added to this wet cake, followed by stirring for 5 hours, and the obtained slurry was evaporated to dryness by a hot air dryer at 110° C. to obtain 145.8 g of a dried product. This dried product was pulverized in a mortar to obtain a powder. This powder was put into an alumina crucible and calcined in the air in an electric furnace at a temperature of 670° C. over a period of 2 hours to obtain 121.3 g of a powder. This powder was yellowish green and as a result of X-ray diffraction, diffraction peaks slightly shifted from diffraction peaks of indium oxide ($In_2O_3$) of ASTM were obtained.

This powder had a specific surface area of 48.6 $m^2/g$ as measured by a BET method and a particle diameter of 17.6 nm as calculated from the specific surface area. Further, from transmission electron microscopic observation, the powder consisted of elliptic colloidal particles having primary particle diameters of from 10 to 30 nm. This powder was press-molded under a pressure of 300 $kg/cm^2$, and the press-molded product showed electro-conductivity with a specific resistance of 13.8 $\Omega$cm.

The obtained calcined powder was put in a glass calcination tube and subjected to reducing calcination in an atmosphere comprising 20 vol % of hydrogen and nitrogen as the rest at a temperature of 170° C. over a period of 2 hours. This powder was blue and as a result of X-ray diffraction, diffraction peaks slightly shifted from diffraction peaks of indium oxide ($In_2O_3$) of ASTM were found.

The powder had a specific surface area of 48.6 $m^2/g$ as measured by a BET method and a particle diameter of 17.6 nm as calculated from the specific surface area. Further, from transmission electron microscopic observation, the powder consisted of elliptic colloidal particles having primary particle diameters of from 10 to 30 nm. This powder was press-molded under a pressure of 300 $kg/cm^2$, and the press-molded product showed an electro-conductivity with a specific resistance of 0.85 $\Omega$cm.

This powder was analyzed by fluorescent X-rays. As a result of the analysis, the $Nb_2O_5$ content was 2.26%, the $Sb_2O_5$ content was 2.59%, the $In_2O_3$ content was 95.45%, the molar ratio was 0.025/0.023/1 as calculated as $Nb_2O_5/Sb_2O_5/In_2O_3$. Namely, the (Nb+Sb)/In molar ratio was 0.048, and the Sb/(Nb+Sb) molar ratio was 0.479.

50 g of this powder and 200 g of water were mixed and dispersed by means of a high pressure homogenizer to obtain 224 g of a sol having niobium- and antimony-doped indium oxide particles dispersed in an aqueous medium. This aqueous sol had transparency and was blue, and had a specific gravity of 1.233, a pH of 3.74, a viscosity of 2.1 mPa·s, a conductivity of 1,400 $\mu$S/cm, a niobium- and antimony-doped indium oxide particle concentration of 22.3 wt %, an average particle diameter of 94 nm as measured by a dynamic light scattering method, a particle diameter of 17.6 nm as measured by a BET method, a total light transmittance of 38.19 as measured by a color difference meter (TOPSCAN MODEL TC-1800MK, manufactured by Tokyo Denshoku Co., Ltd.) when the concentration of niobium- and antimony-doped indium oxide particles was adjusted to 0.2%, color differences a=4.17 and b=19.23, primary particle diameters of from 10 to 30 nm as measured by transmission electron microscopic observation and an average particle diameter of 0.09 μm as measured by a centrifugal sedimentation method.

This sol was stable without formation of a precipitate or abnormality such as gelation, even when left to stand at 50° C. for one month. This sol was coated on a glass sheet by an applicator and dried at 200° C. to form a conductive film of about 2 μm. The transmittance of this coated film was 99%, thus showing excellent transparency. Further, the sheet resistance value was measured and found to be $1.7 \times 10^5$ Ω/□.

EXAMPLE 13

The same operation as in Example 11 was carried out except that the molar ratio as calculated as $Nb_2O_5/In_2O_3$ i.e. the Nb/In molar ratio was 0.032.

EXAMPLE 14

The same operation as in Example 11 was carried out except that the molar ratio as calculated as $Nb_2O_5/In_2O_3$ i.e. the Nb/In molar ratio was 0.079.

EXAMPLE 15

The same operation as in Example 12 was carried out except that the molar ratio as calculated as $Nb_2O_5/Sb_2O_5/In_2O_3$ was 0.049/0.002/1, i.e. the (Nb+Sb)/In molar ratio was 0.051 and the Sb/(Nb+Sb) molar ratio was 0.039, and the reducing calcination temperature was 300° C.

EXAMPLE 16

The same operation as in Example 12 was carried out except that the molar ratio as calculated as $Nb_2O_5/Sb_2O_5/In_2O_3$ was 0.038/0.013/1, i.e. the (Nb+Sb)/In molar ratio was 0.051 and the Sb/(Nb+Sb) molar ratio was 0.255, and the reducing calcination temperature was 250° C.

EXAMPLE 17

The same operation as in Example 12 was carried out except that the molar ratio as calculated as $Nb_2O_5/Sb_2O_5/In_2O_3$ was 0.013/0.038/1, i.e. the (Nb+Sb)/In molar ratio was 0.051 and the Sb/(Nb+Sb) molar ratio was 0.745, and the reducing calcination temperature was 170° C.

EXAMPLE 18

The same operation as in Example 12 was carried out except that the molar ratio as calculated as $Nb_2O_5/Sb_2O_5/In_2O_3$ was 0.013/0.013/1, i.e. the (Nb+Sb)/In molar ratio was 0.026 and the Sb/(Nb+Sb) molar ratio was 0.500.

EXAMPLE 19

The same operation as in Example 12 was carried out except that the molar ratio as calculated as $Nb_2O_5/Sb_2O_5/In_2O_3$ was 0.038/0.038/1, i.e. the (Nb+Sb)/In molar ratio was 0.076 and the Sb/(Nb+Sb) molar ratio was 0.500.

REFERENCE EXAMPLE 1

The same operation as in Example 1 was carried out except that the molar ratio as calculated as $Sb_2O_5/In_2O_3$ was 0.10.

COMPARATIVE EXAMPLE 1

694.2 g of water was added to 396.7 g of a 48% indium trichloride aqueous solution (manufactured by Indium Corp.) for dilution, and 1,078.9 g of a 10% sodium hydroxide aqueous solution was added thereto with stirring at room temperature, followed by reaction for one hour to obtain an indium hydroxide slurry. This slurry had an $In_2O_3$ concentration of 5.6 wt %.

This slurry was subjected to filtration, followed by washing with water until the conductivity of the filtrate became at most 100 μS/cm to obtain 268.8 g of a wet cake.

531.2 g of water was added to this wet cake, followed by stirring for 5 hours, and the obtained slurry was evaporated to dryness by a hot air dryer at 110° C. to obtain 143.2 g of a dried product. This dried product was pulverized in a mortar to obtain a powder. This powder was put into an alumina crucible and calcined in the air in an electric furnace at a temperature of 650° C. over a period of 2 hours to obtain 120.0 g of a powder. This powder was yellowish and as a result of X-ray diffraction, its diffraction peaks corresponded to diffraction peaks of indium oxide ($In_2O_3$) of ASTM.

This powder had a specific surface area of 28.6 $m^2$/g as measured by a BET method and a particle diameter of 29.5 nm as calculated from the specific surface area. Further, from transmission electron microscopic observation, the powder consisted of elliptic colloidal particles having primary particle diameters of from 10 to 30 nm. This powder was press-molded under a pressure of 300 kg/$cm^2$, and the press-molded product showed substantially no electro-conductivity.

The obtained calcined product was put into a glass calcination tube and subjected to reducing calcination in an atmosphere comprising 20 vol % of hydrogen and nitrogen as the rest at a temperature of 140° C. over a period of 2 hours. This powder was yellowish and as a result of X-ray diffraction, it's diffraction peaks corresponded to diffraction peaks of indium oxide ($In_2O_3$) of ASTM.

This powder had a specific surface area of 28.6 $m^2$/g as measured by a BET method and a particle diameter of 29.5 nm as calculated from the specific surface area. Further, from transmission electron microscopic observation, the powder consisted of elliptic colloidal particles having primary particle diameters of from 10 to 30 nm. This powder was press-molded under a pressure of 300 kg/$cm^2$, and the press-molded product showed electro-conductivity with a specific resistance of 250 Ωcm.

The specific resistance was measured by means of four test points method using Loresta IP MCP-T250, trade name, manufactured by Mitsubishi Chemical Corporation.

The results of measuring the specific resistance in Examples 1 to 10, Comparative Example 1 and Reference Example 1 are shown in Table 1.

TABLE 1

| Examples | $ZnO/Sb_2O_5/In_2O_3$ (molar ratio) | Specific resistance after calcination (Ωcm) | Specific resistance after reducing calcination (Ωcm) |
| --- | --- | --- | --- |
| Example 1 | 0/0.05/1 | 1.5 | 0.5 |
| Example 2 | 0/0.05/1 | 2.5 | 0.9 |
| Example 3 | 0.02/0.05/1 | 1.5 | 1.0 |
| Example 4 | 0/0.03/1 | 3.6 | 1.5 |

TABLE 1-continued

| Examples | ZnO/Sb$_2$O$_5$/In$_2$O$_3$ (molar ratio) | Specific resistance after calcination (Ωcm) | Specific resistance after reducing calcination (Ωcm) |
|---|---|---|---|
| Example 5 | 0/0.06/1 | 5.6 | 0.7 |
| Example 6 | 0/0.08/1 | 2.1 | 0.8 |
| Example 7 | 0.05/0.05/1 | 1.6 | 1.3 |
| Example 8 | 0/0.05/1 | 14.7 | 1.0 |
| Example 9 | 0/0.04/1 | 900 | 2.2 |
| Example 10 | 0.01/0.05/1 | 25.3 | 2.7 |
| Reference Example 1 | 0/0.10/1 | 8.1 | 2.0 |
| Comparative Example 1 | 0/0/1 | 5,000,000 | 250 |

The results of measuring the specific resistance in Examples 11 to 19 are shown in Table 2.

TABLE 2

| Examples | Nb$_2$O$_5$Sb$_2$O$_5$/In$_2$O$_3$ (molar ratio) | Specific resistance after calcination (Ωcm) | Specific resistance after reducing calcination (Ωcm) |
|---|---|---|---|
| Example 11 | 0.051/0/1 | 17,200 | 0.17 |
| Example 12 | 0.026/0.026/1 | 13.8 | 0.85 |
| Example 13 | 0.032/0/1 | 20,000 | 0.22 |
| Example 14 | 0.079/0/1 | 21,000 | 0.55 |
| Example 15 | 0.049/0.002/1 | 1,250 | 0.71 |
| Example 16 | 0.038/0.013/1 | 63.7 | 0.89 |
| Example 17 | 0.013/0.038/1 | 3.1 | 0.99 |
| Example 18 | 0.013/0.013/1 | 26.2 | 0.54 |
| Example 19 | 0.038/0.038/1 | 12.3 | 1.88 |

The present invention provides an electro-conductive oxide particle comprising indium atoms, antimony atoms and oxygen atoms in a molar ratio of Sb/In of from 0.03 to 0.08, preferably in a molar ratio of Sb/In of from 0.04 to 0.06, having a primary particle diameter of from 2 to 300 nm, and having a crystal structure of indium oxide. The present invention further provides an electro-conductive oxide particle comprising indium atoms, antimony atoms, zinc atoms and oxygen atoms in a molar ratio of Sb/In of from 0.03 to 0.08 and in a molar ratio of Zn/Sb of from 0.02 to 2.50, having a primary particle diameter of from 2 to 300 nm, and having a crystal structure of indium oxide.

Further, the present invention provides an electro-conductive oxide particle comprising indium atoms, niobium atoms and oxygen atoms in a molar ratio of Nb/In of from 0.01 to 0.10, preferably in a molar ratio of Nb/In of from 0.03 to 0.08, having a primary particle diameter of from 2 to 300 nm, and having a crystal structure of indium oxide. The present invention still further provides an electro-conductive oxide particle comprising indium atoms, niobium atoms, antimony atoms and oxygen atoms in a molar ratio of (Nb+Sb)/In of from 0.01 to 0.10 and in a molar ratio of Sb/(Nb+Sb) of from 0.01 to 0.99, having a primary particle diameter of from 2 to 300 nm, and having a crystal structure of indium oxide.

These electro-conductive oxide particles are a fine particles having a primary particle diameter of from 2 to 300 nm, and it is possible to obtain a highly transparent sol by dispersing them in a solvent. Further, this oxide shows electro-conductivity and has a specific resistance of from 0.1 to 50 Ωcm. This oxide is stable even in an aqueous solution or in an organic solvent, and is stable also at a high temperature.

Accordingly, the electro-conductive oxide particle of the present invention can be used as an antistatic agent or an electromagnetic wave shielding agent by incorporating or coating it to plastic molded products, plastic films, plastic fibers, glass or paper. Further, it may be used as an ultraviolet/infrared absorber when subjected to reducing calcination. It may be used also as a high refractive index coating agent or an antireflection agent. It is particularly useful as a transparent antistatic agent. Further, it may be used as a resistor by coating and calcining it on the surface of glass or ceramics.

The electro-conductive oxide particle of the present invention can be used as e.g. a transparent antistatic agent, a coating agent having antistatic properties, a transparent electromagnetic wave shielding agent or an electroviscous fluid, by mixing it with a partially hydrolyzed liquid of a silane coupling agent such as γ-glycidoxypropyl-trimethoxysilane, γ-glycidoxypropylmethyldiethoxysilane or γ-glycidoxypropylmethyldimethoxysilane, a hydrolyzed liquid of ethylsilicate or methylsilicate, a resin emulsion, a water-soluble high polymer liquid, an organic solvent solution of a resin such as methylmethacrylate, silicone oil or a coating material.

The electro-conductive oxide particle of the present invention can be used also as a surface-treating agent for a metal by mixing it with e.g. water glass, an aqueous aluminum phosphate solution, an aqueous chromic acid solution or a plating solution.

Further, the oxide may also be used as a microfiller for a composite material of e.g. a metal, a plastic or a ceramic.

The entire disclosures of Japanese Patent Application No. 2000-354708 filed on Nov. 21, 2000 and Japanese Patent Application No. 2001-001230 filed on Jan. 9, 2001 including specifications, claims, drawings and summaries are incorporated herein by reference in their entireties.

What is claimed is:

1. An electro-conductive oxide particle comprising indium atoms, antimony atoms and oxygen atoms in a molar ratio of Sb/In of from 0.03/1 to 0.08/1, having a primary particle diameter of from 2 to 300 nm, and having a crystal structure of indium oxide.

2. An electro-conductive oxide particle comprising indium atoms, antimony atoms and oxygen atoms in a molar ratio of Sb/In of from 0.04/1 to 0.06/1, having a primary particle diameter of from 2 to 300 nm, and having a crystal structure of indium oxide.

3. An electro-conductive oxide particle comprising indium atoms, antimony atoms, zinc atoms and oxygen atoms in a molar ratio of Sb/In of from 0.03/1 to 0.08/1 and in a molar ratio of Zn/Sb of from 0.02/1 to 2.50/1, having a primary particle diameter of from 2 to 300 nm, and having a crystal structure of indium oxide.

4. An electro-conductive oxide particle comprising indium atoms, niobium atoms and oxygen atoms in a molar ratio of Nb/In of from 0.01/1 to 0.10/1, having a primary particle diameter of from 2 to 300 nm, and having a crystal structure of indium oxide.

5. An electro-conductive oxide particle comprising indium atoms, niobium atoms and oxygen atoms in a molar ratio of Nb/In of from 0.03/1 to 0.08/1, having a primary particle diameter of from 2 to 300 nm, and having a crystal structure of indium oxide.

6. An electro-conductive oxide particle comprising indium atoms, niobium atoms, antimony atoms and oxygen atoms in a molar ratio of (Nb+Sb)/In of from 0.01/1 to 0.10/1 and in a molar ratio of Sb/(Nb+Sb) of from 0.01/1 to 0.99/1, having a primary particle diameter of from 2 to 300 nm, and having a crystal structure of indium oxide.

7. The electro-conductive oxide particle according to claim 1, which is a stick particle having an aspect ratio of from 2 to 10.

8. The electro-conductive oxide particle according to claim 2, which is a stick particle having an aspect ratio of from 2 to 10.

9. The electro-conductive oxide particle according to claim 3, which is a stick particle having an aspect ratio of from 2 to 10.

10. The electro-conductive oxide particle according to claim 4, which is a stick particle having an aspect ratio of from 2 to 10.

11. The electro-conductive oxide particle according to claim 5, which is a stick particle having an aspect ratio of from 2 to 10.

12. The electro-conductive oxide particle according to claim 6, which is a stick particle having an aspect ratio of from 2 to 10.

13. A process for producing the electro-conductive oxide particle according to claim 1, which comprises calcining a mixture of an In compound and an Sb compound in the air at a temperature of from 500 to 900° C.

14. The process according to claim 13, wherein after said calcining, the process further comprises reducing calcination in an atmosphere comprising hydrogen and nitrogen in a volume % of 2–100:98–0 and at a temperature of from 80 to 450° C.

15. A process for producing the electro-conductive oxide particle according to claim 1, which comprises contacting a mixture of an In compound and an Sb compound with an alkali compound in an aqueous medium to form a slurry of indium hydroxide doped with at least one metal element, washing and drying the slurry; and calcining the dried slurry in the air at a temperature of from 500 to 900° C.

16. The process according to claim 15, wherein after said calcining, the process further comprises reducing calcination in an atmosphere comprising hydrogen and nitrogen in a volume % of 2–100:98–0 and at a temperature of from 80 to 450° C.

17. A process for producing the electro-conductive oxide particle according to claim 2, which comprises calcining a mixture of an In compound, and an Sb compound in the air at a temperature of from 500 to 900° C.

18. The process according to claim 17, wherein after said calcining, the process further comprises reducing calcination in an atmosphere comprising hydrogen and nitrogen in a volume % of 2–100:98–0 and at a temperature of from 80 to 450° C.

19. A process for producing the electro-conductive oxide particle according to claim 2, which comprises contacting a mixture of an In compound and an Sb compound with an alkali compound in an aqueous medium to form a slurry of indium hydroxide doped with at least one metal element, washing and drying the slurry; and calcining the dried slurry in the air at a temperature of from 500 to 900° C.

20. The process according to claim 19, wherein after said calcining, the process further comprises reducing calcination in an atmosphere comprising hydrogen and nitrogen in a volume % of 2–100:98–0 and at a temperature of from 80 to 450° C.

21. A process for producing the electro-conductive oxide particle according to claim 3, which comprises calcining a mixture of an In compound, an Sb compound, and a Zn compound in the air at a temperature of from 500 to 900° C.

22. The process according to claim 21, wherein after said calcining, the process further comprises reducing calcination in an atmosphere comprising hydrogen and nitrogen in a volume % of 2–100:98–0 and at a temperature of from 80 to 450° C.

23. A process for producing the electro-conductive oxide particle according to claim 3, which comprises contacting a mixture of an In compound, an Sb compound, and a Zn compound with an alkali compound in an aqueous medium to form a slurry of indium hydroxide doped with at least one metal element, washing and drying the slurry; and calcining the dried slurry in the air at a temperature of from 500 to 900° C.

24. The process according to claim 23, wherein after said calcining, the process further comprises reducing calcination in an atmosphere comprising hydrogen and nitrogen in a volume % of 2–100:98–0 and at a temperature of from 80 to 450° C.

25. A process for producing the electro-conductive oxide particle according to claim 4, which comprises calcining a mixture of an In compound and a Nb compound in the air at a temperature of from 500 to 900° C.

26. The process according to claim 25, wherein after said calcining, the process further comprises reducing calcination in an atmosphere comprising hydrogen and nitrogen in a volume % of 2–100:98–0 and at a temperature of from 80 to 450° C.

27. A process for producing the electro-conductive oxide particle according to claim 4, which comprises contacting a mixture of an In compound and a Nb compound with an alkali compound in an aqueous medium to form a slurry of indium hydroxide doped with at least one metal element, washing and drying the slurry; and calcining the dried slurry in the air at a temperature of from 500 to 900° C.

28. The process according to claim 27, wherein after said calcining, the process further comprises reducing calcination in an atmosphere comprising hydrogen and nitrogen in a volume % of 2–100:98–0 and at a temperature of from 80 to 450° C.

29. A process for producing the electro-conductive oxide particle according to claim 5, which comprises calcining a mixture of an In compound and a Nb compound in the air at a temperature of from 500 to 900° C.

30. The process according to claim 29, wherein after said calcining, the process further comprises reducing calcination in an atmosphere comprising hydrogen and nitrogen in a volume % of 2–100:98–0 and at a temperature of from 80 to 450° C.

31. A process for producing the electro-conductive oxide particle according to claim 5, which comprises contacting a mixture of an In compound and a Nb compound with an alkali compound in an aqueous medium to form a slurry of indium hydroxide doped with at least one metal element, washing and drying the slurry; and calcining the dried slurry in the air at a temperature of from 500 to 900° C.

32. The process according to claim 31, wherein after said calcining, the process further comprises reducing calcination in an atmosphere comprising hydrogen and nitrogen in a volume % of 2–100:98–0 and at a temperature of from 80 to 450° C.

33. A process for producing the electro-conductive oxide particle according to claim 6, which comprises calcining a mixture of an In compound, a Nb compound and an Sb compound in the air at a temperature of from 500 to 900° C.

34. The process according to claim 33, wherein after said calcining, the process further comprises reducing calcination in an atmosphere comprising hydrogen and nitrogen in a volume % of 2–100:98–0 and at a temperature of from 80 to 450° C.

35. A process for producing the electro-conductive oxide particle according to claim 6, which comprises contacting a mixture of an In compound, a Nb compound and an Sb compound with an alkali compound in an aqueous medium to form a slurry of indium hydroxide doped with at least one metal element, washing and drying the slurry; and calcining the dried slurry in the air at a temperature of from 500 to 900° C.

36. The process according to claim 35, wherein after said calcining, the process further comprises reducing calcination in an atmosphere comprising hydrogen and nitrogen in a volume % of 2–100:98–0 and at a temperature of from 80 to 450° C.

37. A process for producing the electro-conductive oxide particle according to claim 7, which comprises contacting a mixture of an In compound and an Sb compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

38. The process according to claim 35, wherein after said calcining, the process further comprises reducing calcination in an atmosphere comprising hydrogen and nitrogen in a volume % of 2–100:98–0 and at a temperature of from 80 to 450° C.

39. A process for producing the electro-conductive oxide particle according to claim 7, which comprises contacting an aqueous medium containing a mixture of an In compound and an Sb compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

40. The process according to claim 33, wherein after said calcining, the process further comprises reducing calcination in an atmosphere comprising hydrogen and nitrogen in a volume % of 2–100:98–0 and at a temperature of from 80 to 450° C.

41. A process for producing the electro-conductive oxide particle according to claim 8, which comprises contacting a mixture of an In compound and an Sb compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

42. The process according to claim 41, wherein after said calcining, the process further comprises reducing calcination in an atmosphere comprising hydrogen and nitrogen in a volume % of 2–100:98–0 and at a temperature of from 80 to 450° C.

43. A process for producing the electro-conductive oxide particle according to claim 8, which comprises contacting an aqueous medium containing a mixture of an In compound and an Sb compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

44. The process according to claim 43, wherein after said calcining, the process further comprises reducing calcination in an atmosphere comprising hydrogen and nitrogen in a volume % of 2–100:98–0 and at a temperature of from 80 to 450° C.

45. A process for producing the electro-conductive oxide particle according to claim 9, which comprises contacting a mixture of an In compound, an Sb compound, and a Zn compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

46. The process according to claim 45, wherein after said calcining, the process further comprises reducing calcination in an atmosphere comprising hydrogen and nitrogen in a volume % of 2–100:98–0 and at a temperature of from 80 to 450° C.

47. A process for producing the electro-conductive oxide particle according to claim 9 which comprises contacting an aqueous medium containing a mixture of an In compound, an Sb compound, and a Zn compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

48. The process according to claim 47 wherein after said calcining, the process further comprises reducing calcination in an atmosphere comprising hydrogen and nitrogen in a volume % of 2–100:98–0 and at a temperature of from 80 to 450° C.

49. A process for producing the electro-conductive oxide particle according to claim 10 which comprises contacting a mixture of an In compound and a Nb compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

50. The process according to claim 49 wherein after said calcining, the process further comprises reducing calcination in an atmosphere comprising hydrogen and nitrogen in a volume % of 2–100:98–0 and at a temperature of from 80 to 450° C.

51. A process for producing the electro-conductive oxide particle according to claim 10 which comprises contacting an aqueous medium containing a mixture of an In compound and a Nb compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

52. The process according to claim 51, wherein after said calcining, the process further comprises reducing calcination in an atmosphere comprising hydrogen and nitrogen in a volume % of 2–100:98–0 and at a temperature of from 80 to 450° C.

53. A process for producing the electro-conductive oxide particle according to claim 11, which comprises contacting a mixture of an In compound and a Nb compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

54. The process according to claim 53, wherein after said calcining, the process further comprises reducing calcination in an atmosphere comprising hydrogen and nitrogen in a volume % of 2–100:98–0 and at a temperature of from 80 to 450° C.

55. A process for producing the electro-conductive oxide particle according to claim 11, which comprises contacting an aqueous medium containing a mixture of an In compound and a Nb compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

56. The process according to claim 55, wherein after said calcining, the process further comprises reducing calcination in an atmosphere comprising hydrogen and nitrogen in a volume % of 2–100:98–0 and at a temperature of from 80 to 450° C.

57. A process for producing the electro-conductive oxide particle according to claim 12, which comprises contacting a mixture of an In compound, a Nb compound and an Sb compound with an alkalai compound in an aqueous medium at a temperature of from 0 to 10° C. to form a slurry of indium hydroxide doped with at least one metal element, washing and drying the slurry; and calcining the dried slurry in the air at a temperature of from 500° C. to 900° C.

58. The process according to claim 57, wherein after said calcining, the process further comprises reducing calcination in an atmosphere comprising hydrogen and nitrogen in a volume % of 2–100:98–0 and at a temperature of from 80 to 450° C.

59. A process for producing the electro-conductive oxide particle according to claim 12, which comprises contacting an aqueous medium containing a mixture of an In compound, a Nb compound and an Sb compound with a heat resistant strongly basic ion exchange resin, followed by heating at a temperature of from 40 to 100° C. to form a slurry of indium hydroxide doped with at least one metal element, drying the slurry and calcining the dried slurry in the air at a temperature of from 500 to 900° C.

60. The process according to claim 59, wherein after said calcining, the process further comprises reducing calcination in an atmosphere comprising hydrogen and nitrogen in a volume % of 2–100:98–0 and at a temperature of from 80 to 450° C.

* * * * *